US008721945B2

(12) United States Patent
Phelan

(10) Patent No.: US 8,721,945 B2
(45) Date of Patent: May 13, 2014

(54) ACTINICALLY CURABLE SILICONE HYDROGEL COPOLYMERS AND USES THEREOF

(71) Applicant: Novartis AG, Basel (CH)

(72) Inventor: John Christopher Phelan, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 13/956,709

(22) Filed: Aug. 1, 2013

(65) Prior Publication Data
US 2013/0313731 A1 Nov. 28, 2013

Related U.S. Application Data

(62) Division of application No. 12/001,521, filed on Dec. 12, 2007, now Pat. No. 8,524,800.

(60) Provisional application No. 60/869,817, filed on Dec. 13, 2006.

(51) Int. Cl.
B29D 11/00 (2006.01)
G02B 1/12 (2006.01)
C08J 3/28 (2006.01)

(52) U.S. Cl.
USPC ........... 264/137; 264/1.36; 264/1.7; 264/134; 264/135; 264/136

(58) Field of Classification Search
None
See application file for complete search history.

(56) References Cited

U.S. PATENT DOCUMENTS

| 3,536,386 | A | 10/1970 | Spivack |
| 4,229,273 | A | 10/1980 | Wajs |
| 4,444,711 | A | 4/1984 | Schad |
| 4,460,534 | A | 7/1984 | Boehm |
| 4,536,554 | A | 8/1985 | Lim |
| 4,582,402 | A | 4/1986 | Knapp |
| 4,632,968 | A | 12/1986 | Yokota et al. |
| 4,668,240 | A | 5/1987 | Loshaek |
| 4,704,017 | A | 11/1987 | Knapp |
| 4,857,072 | A | 8/1989 | Narducy |
| 4,983,702 | A | 1/1991 | Mueller |
| 4,990,582 | A | 2/1991 | Salamone |
| 5,034,166 | A | 7/1991 | Rawlings |
| 5,087,392 | A | 2/1992 | Burke |
| 5,160,463 | A | 11/1992 | Evans |
| 5,219,965 | A | 6/1993 | Valint, Jr. |
| 5,227,432 | A | 7/1993 | Jung |
| 5,272,010 | A | 12/1993 | Quinn |
| 5,336,797 | A | 8/1994 | McGee |
| 5,387,663 | A | 2/1995 | McGee |
| 5,414,477 | A | 5/1995 | Jahnke |
| 5,449,729 | A | 9/1995 | Lai |
| 5,505,884 | A | 4/1996 | Burke |
| 5,563,184 | A | 10/1996 | McGee |
| 5,580,498 | A | 12/1996 | Sugiyama |
| 5,656,210 | A | 8/1997 | Hill |
| 5,665,840 | A | 9/1997 | Pöhlmann |
| 5,684,059 | A | 11/1997 | Salamone |
| 5,708,094 | A | 1/1998 | Lai |
| 5,760,100 | A | 6/1998 | Nicolson |
| 5,843,346 | A | 12/1998 | Morrill |
| 5,894,002 | A | 4/1999 | Boneberger |
| 5,981,669 | A | 11/1999 | Valint, Jr. |
| 5,981,675 | A | 11/1999 | Valint, Jr. |
| 5,998,498 | A | 12/1999 | Vanderlaan |
| 6,039,913 | A | 3/2000 | Hirt |
| 6,627,124 | B1 | 9/2003 | Herbrechtsmeier |
| 6,762,264 | B2 | 7/2004 | Künzler |
| 6,765,083 | B2 | 7/2004 | Ford |
| 6,800,225 | B1 | 10/2004 | Hagmann |
| 6,811,259 | B2 | 11/2004 | Tucker |
| 6,822,016 | B2 | 11/2004 | McCabe |
| 6,899,426 | B2 | 5/2005 | Tucker |
| 6,943,203 | B2 | 9/2005 | Vanderlaan |
| 6,955,832 | B2 | 10/2005 | Quinn |
| 7,052,131 | B2 | 5/2006 | McCabe |
| 7,091,283 | B2 | 8/2006 | Müller |
| 7,213,918 | B2 | 5/2007 | Phelan |
| 7,238,750 | B2 | 7/2007 | Müller |
| 7,249,848 | B2 | 7/2007 | Laredo |

(Continued)

FOREIGN PATENT DOCUMENTS

| DE | 37 10343 A1 | 3/1987 |
| EP | 0 216 074 B1 | 7/1986 |
| EP | 0216074 A2 | 4/1987 |
| EP | 0 331 633 B1 | 2/1989 |
| EP | 0331633 A2 | 9/1989 |
| WO | 9209421 A2 | 6/1992 |
| WO | 9218548 A1 | 10/1992 |
| WO | WO 92/18548 | 10/1992 |
| WO | WO 92/09421 | 11/1992 |
| WO | 9309084 A1 | 5/1993 |
| WO | WO 93/09084 | 5/1993 |

(Continued)

OTHER PUBLICATIONS

PCT International Search Report dated Nov. 24, 2009.

(Continued)

Primary Examiner — Vu A Nguyen
(74) Attorney, Agent, or Firm — Sheng-Hsin Hu; Jian Zhou

(57) ABSTRACT

The present invention provides inks and methods for making colored silicone hydrogel contact lenses. The ink of the invention comprises an actinically-curable binder copolymer comprising fluorine-containing segments and is characterized by having capability to be cured actinically or thermally to form a colored film on a molding surface of a mold or a silicone hydrogel contact lens and by having an increased durability in a solvated state in a silicone-hydrogel lens formulation in relation to a control colored film obtained from a control ink including an actinically-curable fluorine-free binder copolymer. The invention also provides methods for making colored silicone hydrogel contact lenses based on print-on-mold processes for producing colored contact lenses.

6 Claims, No Drawings

(56) References Cited

U.S. PATENT DOCUMENTS

| | | |
|---|---|---|
| 7,255,438 B2 | 8/2007 | Atkins |
| 7,268,189 B2 | 9/2007 | Müller |
| 7,329,695 B2 | 2/2008 | Tucker |
| 7,384,590 B2 | 6/2008 | Kelly |
| 7,387,759 B2 | 6/2008 | Kelly |
| 7,411,008 B2 | 8/2008 | Tucker |
| 7,638,075 B2 | 12/2009 | Quinn |
| 2001/0050753 A1 | 12/2001 | Tucker |
| 2003/0054109 A1 | 3/2003 | Quinn |
| 2003/0119943 A1 | 6/2003 | Tucker |
| 2003/0184710 A1 | 10/2003 | Tucker |
| 2004/0044099 A1 | 3/2004 | Tucker |
| 2005/0218536 A1 | 10/2005 | Quinn |
| 2005/0221105 A1 | 10/2005 | Quinn |
| 2005/0237483 A1 | 10/2005 | Phelan |
| 2006/0012751 A1 | 1/2006 | Rosenzweig |
| 2006/0055882 A1 | 3/2006 | Phelan |
| 2006/0065138 A1 | 3/2006 | Tucker |
| 2006/0077341 A1 | 4/2006 | Atkins |
| 2006/0116437 A1 | 6/2006 | Turek |

FOREIGN PATENT DOCUMENTS

| | | |
|---|---|---|
| WO | 9323773 A1 | 11/1993 |
| WO | WO 93/23773 | 11/1993 |
| WO | 9825982 A1 | 6/1998 |
| WO | WO 98/25982 | 6/1998 |
| WO | 0059970 A1 | 10/2000 |
| WO | WO 00/59970 | 12/2000 |

OTHER PUBLICATIONS

PCT Written Opinion of the International Searching Authority dated Nov. 24, 2009.

ACTINICALLY CURABLE SILICONE HYDROGEL COPOLYMERS AND USES THEREOF

This application is a division of U.S. patent application Ser. No. 12/001,521, filed Dec. 12, 2007 which claims the benefit under 35 U.S.C. §119 (e) of U.S. provisional Application No. 60/869,817 filed Dec. 13, 2006, incorporated by reference in its entirety.

The present invention is related to an actinically or thermally curable ink and methods for making colored contact lenses, in particular, to colored silicone hydrogel contact lenses.

BACKGROUND OF THE INVENTION

In recent years, silicone hydrogel contact lenses become more and more popular because of corneal health benefits provided by their high oxygen permeability and comfort. Although various methods have been disclosed to make colored non-silicone hydrogel contact lenses (see, for example, disclosed in U.S. Pat. Nos. 4,668,240, 4,857,072, 5,272,010, and 5,414,477 and U.S. Patent Application publication Nos. 2003/0054109, 2004/0044099, 2005/0221105, 2006/0065138, and 2006/0077341, all of which are incorporated herein by reference), only a few methods (see, e.g., co-pending U.S. Patent Application Nos. 2005/0237483 and 2006/0055882) have been developed for making colored silicone hydrogels contact lenses which can enhance the natural beauty of the eye.

However, there are some limitations associated with the inks disclosed in those co-pending patent applications. For example, those inks may not be well suitable for making colored silicone hydrogel contact lenses based on a print-on-mold process, in which colored contact lenses can be produced by printing inks on molds, curing the inks, filling the molds with lens formulation, closing mold assemblies and finally curing the lens in the molds. Unlike non-silicone hydrogel lens formulations, silicone hydrogel lens formulations contain organic solvent, monomers, or both thereof, which have high solvating capability. Once the cured inks or partially cured inks on a mold are exposed to a lens formulation, the cured or partially cured inks may be solvated by some monomers and solvent in the lens formulation. Since the cured ink can be soaked in the lens formulation inevitably for a relatively long period of time in the manufacturing environment (e.g., such as, line stoppage or line staging operations), the cured ink may become fragile. As such, the printed image on the mold may be susceptible to damages as excess lens formulation is sheared across it during mold closing and therefore can compromise the quality of printed images. It is desirable that, during the production of colored silicone hydrogel contact lenses by a print-on-mold process, ink prints cured on molds are durable even if it is soaked in a lens formulation prior to closing molds and curing the lens formulation.

In addition, during the manufacture of silicone hydrogel contact lenses it is often necessary and or desirable to extract lenses with organic solvent (e.g. methanol, ethanol, isopropanol). During extraction in organic solvent, lens dimensions often increase substantially as compared to lens dimensions in water. The lens extraction in organic solvent is often followed by extraction in water and equilibration in saline. Therefore there is a need for silicone hydrogel binder polymers and ink systems that can withstand large and substantially reversible dimensional changes as colored silicone hydrogel lenses are extracted in organic solvent and water. If the cured ink is too weak it might rupture and the print pattern could be damaged. It is therefore important to have a means to influence or adjust expansion characteristics of cured inks (or binder polymers) in both organic and water solvents.

Therefore, there exist needs for methods of making colored silicone hydrogel contact lenses, and for inks suitable for making colored silicone-hydrogel lenses with high-quality color images thereon.

SUMMARY OF THE INVENTION

In one aspect, the present invention provides a method for making a colored silicone hydrogel contact lens, comprising the steps of: (a) applying a color coat to at least a portion of at least one of molding surfaces of a lens mold with an ink comprising at least one colorant, a solvent, and a fluorine-containing binder copolymer, wherein the fluorine-containing binder copolymer comprises multiple ethylenically unsaturated groups, hydrophilic segments derived from one or more hydrophilic vinylic monomers, fluorine-containing segments derived from one or more fluorine-containing vinylic monomers, and silicone-containing segments derived from at least one first silicone-containing vinylic monomer or macromer, wherein the colored coat contains a first surface exposed to the interior of the lens-forming cavity and a second surface in contact with the molding surface; (b) curing the color coat to form a color film which comprises a colorant-entrapping polymer network and the colorant entrapped therein, wherein the amount of the ethylenically unsaturated groups in the fluorine-containing binder polymer is high enough to ensure that the fluorine-containing binder copolymer can be crosslinked actinically or thermally to form the colorant-entrapping polymer network capable of entrapping the colorant in the ink; (c) dispensing a lens-forming material into the lens-forming cavity of the mold, wherein the lens-forming material comprises at least one second silicone-containing vinylic monomer or macromer or a silicone-containing prepolymer; and (d) curing the lens-forming material within the lens-forming cavity to form the silicone hydrogel contact lens, whereby the colored coat detaches from the molding surface and becomes integral with the body of the silicone hydrogel contact lens.

In another aspect, the present invention provides an ink for making colored contact lenses, in particular, colored silicone hydrogel contact lenses. The ink of the invention comprises at least one colorant, a solvent, and a fluorine-containing binder copolymer, wherein the fluorine-containing binder copolymer comprises multiple ethylenically unsaturated groups, hydrophilic segments derived from one or more hydrophilic vinylic monomers, fluorine-containing segments derived from one or more fluorine-containing vinylic monomers, and silicone-containing segments derived from at least one silicone-containing vinylic monomer or macromer, wherein the amount of the ethylenically unsaturated groups in the fluorine-containing binder polymer is high enough to ensure that the fluorine-containing binder copolymer can be crosslinked actinically or thermally to form a colorant-entrapping polymer network capable of entrapping the colorant in the ink, wherein the ink is characterized by having capability to be cured actinically or thermally to form a colored film on a molding surface of a mold, wherein the colored film comprises the colorant-entrapping polymer network and the colorant entrapped therein, wherein the colored film is characterized by having an increased durability in a solvated state in a silicone-hydrogel lens formulation in relation to a control colored film obtained from a control ink including an actinically-curable fluorine-free binder copolymer, wherein the colored film has good adhesion to the contact lens without being covalently attached to the lens material of the contact lens.

In still another aspect, the present invention provides an actinically-curable fluorine-containing copolymer, comprising multiple ethylenically unsaturated groups, hydrophilic segments derived from one or more hydrophilic vinylic monomers, fluorine-containing segments derived from one or more fluorine-containing vinylic monomers, and silicone-containing segments derived from at least one silicone-containing vinylic monomer or macromer. The copolymer can also contain hydrocarbon segments derived from one or more hydrocarbon containing vinylic monomers.

In a further aspect, the present invention provides a contact lens which is obtained by copolymerization of a lens-forming fluid material including an actinically-curable fluorine-containing copolymer which comprises multiple ethylenically unsaturated groups, hydrophilic segments derived from one or more hydrophilic vinylic monomers, fluorine-containing segments derived from one or more fluorine-containing vinylic monomers, and silicone-containing segments derived from at least one silicone-containing vinylic monomer or macromer.

The present invention provides the foregoing and other features, and the advantages of the invention will become further apparent from the following detailed description of the example embodiments set forth herein, read in conjunction with the accompanying figures. The detailed description and figures are merely illustrative of the invention and do not limit the scope of the invention, which is defined by the appended claims and equivalents thereof.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a rotation mark for toric lenses; or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

"Colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260)

and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster, resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

"Stable" in reference to an ink, as used herein, means that no liquid phase separation and/or pigment precipitation and/or increase of viscosity occurs over a specific time period. A stable ink can provide more flexibility in producing colored ophthalmic lenses.

As used herein, the term "good adhesion to a medical device" in reference to an ink means that a color image printed with the ink on a contact lens can pass at least a finger rubbing test, preferably pass the finger rubbing test and a sterilization-surviving test.

A "binder polymer" or a "binder copolymer" refers to a crosslinkable polymer that can be crosslinked actinically or thermally to trap or bind colorants onto or into a medical device (preferably a contact lens) such as that term is known in the art.

As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "olefinically unsaturated group" is employed herein in a broad sense and is intended to encompass any groups containing at least one $>C=C<$ group. Exemplary ethylenically unsaturated groups include without limitation acryloyl, methacryloyl, allyl, vinyl, styrenyl, or other $C=C$ containing groups.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition which can be cured (i.e., polymerized and/or crosslinked) thermally or actinically to obtain a crosslinked polymer. Lens-forming materials are well known to a person skilled in the art.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium to high molecular weight compound or polymer that contains one or more ethylenically unsaturated groups and can be polymerized actinically or thermally. Medium and high molecular weight typically means average molecular weights greater than 700 Daltons.

A "polymer" means a material formed by polymerizing/crosslinking one or more monomers, macromers and or oligomers.

As used herein, a "prepolymer" refers to a starting polymer which can be cured (e.g., crosslinked and/or polymerized) actinically or thermally to obtain a crosslinked and/or polymerized polymer having a molecular weight much higher than the starting polymer.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitnle), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference.

A "print-on-mold process for producing colored contact lenses" refers to a process for molding a colored contact lens described in U.S. Pat. No. 5,034,166 to Rawlings et al. (herein incorporated by reference). Generally, according to such process, colored contact lenses are produced by printing inks on molds, curing the inks, filling the molds with a lens formulation (or a lens-forming material), closing mold assemblies and finally curing the lens formulation in the molds.

As used herein, "increased durability" in reference to a colored film obtained from an ink (testing) containing an actinically-curable fluorine-containing binder copolymer is intended to describe that such colored film in a solvated state by a silicone hydrogel lens formulation, such as, for example, lotrafilcon A or lotrafilcon B, has an increased value of tensile strength relative to a controlled colored film in a solvated state by the same silicone hydrogel lens formulation, wherein the controlled colored film is obtained by curing a control ink with a fluorine-free binder copolymer. It should be understood that the control ink differs from the testing ink only in binder copolymer. The binder copolymer in the control ink does not contain any fluorine-containing segments, but instead contains all of the other segments of the binder copolymer in the testing ink.

As used herein, "increased lubricity" in reference to a coated contact lens means that the coated contact lens has a reduced averaged value of coefficient of friction relative to an uncoated contact lens, wherein both coated and uncoated contact lenses are made of the same core material.

The present invention is generally directed to inks and methods for making colored silicone hydrogel contact lenses. The present invention is partly based on the discovery that when an actinically-curable binder copolymer comprising fluorine-containing segments is used in an ink for making colored silicone hydrogel contact lenses by using a print-on-mold process, ink prints cured on molds are durable even it is soaked in a lens formulation prior to closing molds and curing the lens formulation. It is believed that presence of fluorine-containing segments derived from fluorine-containing monomers in the binder copolymer can increase the durability of a cured ink in a solvated state by a silicone-hydrogel lens formulation (e.g., lotrafilcon A or lotrafilcon B), i.e., the mechanical (or tensile) strength of the cured ink in a solvated state and the cured ink's tolerance toward monomers and solvent in a silicone hydrogel lens formulation. Good durability of a thin ink film in a solvated state (solvated by monomer and solvent) can minimize damages resulting from the shearing force when excess formulation is sheared across it during mold closing operation. It is also believed that incorporation of fluorine-containing units in a binder copolymer in an ink may impart adequate adhesion of ink print onto molds. During the print-on-mold manufacturing process, the cured ink print must adhere to the mold to maintain precisely the position on the mold, as it is soaked in a silicone hydrogel lens formulation. Upon curing of the lens formulation, the cured or partially cured ink print must become part of the lens and ultimately release from the mold. As a result, colored silicone hydrogel contact lenses with higher print quality can be produced by using an actinically-curable fluorine-containing binder copolymer as binder polymer in an ink for making colored silicone hydrogel lenses.

It is also believed that incorporation of fluorine containing monomers into silicone hydrogel ink binders can increase the range of solubility/swelling characteristics of cured inks. In some instances it might be advantageous to have some amount of monomer (unconverted monomer from the polymerization or monomer added back into the binder polymer at the end of polymerization). If preferred Optionally, additional monomer and or macromer could be added directly to an ink. Uncured monomer in an ink can be used to adjust viscosity and degree of shrinkage during ink cure. The degree of unconverted monomer might have an impact on the durability of the cured ink. Too much excess monomer may result in poor ink durability.

It is further believed that the cured ink advantageously is able to undergo substantial reversible expansion and contraction during lens extraction in both organic and aqueous based solvents and maintain good image quality.

There are several unique advantages associated with use of an ink including an actinically-curable fluorine-containing copolymer as a binder polymer in making colored silicone hydrogel contact lenses. First, such ink is photo-curable or thermal curable (thermo-curable). Such feature can provide manufacturers flexibility in designing a manufacturing process for producing colored silicone hydrogel contact lenses. Second, curing kinetics of inks can be controllable by varying photo-initiator structure, photo-initiator concentration, UV source, UV intensity, the amount of ethylenically unsaturated groups in a binder copolymer and the type of ethylenically unsaturated groups (e.g. methacrylate cures slower than acrylate) in the binder copolymer. Third, inks of the invention can be used to make lenses with multiple prints, because a printed ink can be photocured at a relatively fast rate and no significant down-time would occur between two prints. Inks used to produce lenses with multiple prints can be cured simultaneously or separately as needed. Fourth, inks of the invention would not have a significantly adverse effects upon the oxygen permeability of a colored silicone hydrogel contact lens. Incorporation of fluorine-containing segments into copolymer structures is expected to further enhance oxygen permeability of the ink prints on lenses as compared to hydrocarbon monomers. Fifth, the cured ink prints on a mold are durable, mechanical stronger and significantly less susceptible to damages from shearing force during mold closing. Sixth, it might be possible to alter adhesive properties and surface energy of inks by simply warming the inks prior to UV-cure, since fluorine-containing segments are susceptible to conformational rearrangement at a relatively higher temperature. Low surface energy properties often associated with fluoropolymers depend, at least in part, on the surface concentration of the fluorocarbon chain or chain end (see M. Bernett, Ind. Eng. Chem., Prod. Res. Develop., Vol 13, No 4, 1974). For this reason, one might expect that linear-fluoro-carbon side chains might be more closely packed than branched or cyclic fluoro-carbon units. Seventh, ink prints obtained by using an ink containing a fluorine-containing binder copolymer would be more resistant toward soiling (e.g. protein deposition).

In addition, the degree of expansion or contraction of silicone hydrogel copolymers can be controlled when used in inks for making colored contact lenses. Generally, these materials might come into contact with solvents and or monomers during lens manufacturing. If print pattern undergoes significant non-reversible expansion during exposure to monomer and/or solvent, the final print quality will be compromised.

Furthermore, both silicone and fluoro containing materials are expected to have relatively low surface tensions. Therefore, fluorosilicone-hydrogel copolymers are expected to have good wetting characteristics for printing on low surface energy surfaces. This will be advantageous for printing on molds with relatively low surface energy (e.g., polypropylene molds or other plastic molds) or directly onto silicone hydrogel lenses.

In accordance with the invention, an actinically-curable fluorine-containing copolymer comprises: multiple ethylenically unsaturated groups, hydrophilic segments derived from one or more hydrophilic vinylic monomers, fluorine-containing segments derived from one or more fluorine-containing vinylic monomers, and silicone-containing segments derived from at least one first silicone-containing vinylic monomer or macromer. Preferably, the amount of the ethylenically unsaturated groups in the binder copolymer is sufficiently high to ensure that the fluorine-containing binder copolymer can be crosslinked actinically or thermally to form a colorant-entrapping polymer network capable of entrapping the colorant, such as, for example, pigments, in the ink.

An actinically-curable fluorine-containing copolymer of the invention preferably is an ethylenically functionalized derivative of a fluorine-containing copolymer having pendant functional groups, preferably selected from the group consisting of hydroxyl groups (—OH), primary amino groups (—NH$_2$), secondary amino groups (—NHR), carboxylic groups (—COOH), epoxy groups, aldehyde groups (—CHO), amide groups (—CONH$_2$), acid halide groups (—COX, X=Cl, Br, or I), isothiocyanate groups, isocyanate groups, halide groups (—X, X=Cl, Br, or I), acid anhydride groups, and combinations thereof. Copolymer can also contain hydrocarbon monomer segments.

The term "ethylenically functionalized" as used herein is intended to describe the introduction of ethylenically unsaturated groups into the silicone-containing polymer with pendant functional groups.

In one preferred embodiment, the fluorine-containing copolymer with pendant functional groups is a copolymerization product of a polymerizable composition, which comprises (a) at least one fluorine-containing vinylic monomer, (b) at least one hydrophilic vinylic monomer, (c) at least one functionalizing vinylic monomer containing at least one functional group, and (d) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent.

In another preferred embodiment, the fluorine-containing copolymer with pendant functional groups is a copolymerization product of a polymerizable composition, which comprises (a) at least one fluorine-containing vinylic monomer, (b) at least one hydrophilic vinylic monomer, (c) at least one chain transfer agent comprising a chain transfer group and a functional group to obtain a copolymerization product with functional groups. The polymerizable composition can also include a polymerization initiator (i.e., a photoinitiator or a thermal initiator) and a solvent which is preferably the solvent used in an ink.

In accordance with the invention, any fluorine-containing monomer can be used in the invention. Preferably, a fluorine-containing monomer contains at least 3 fluorine atoms per monomer molecule that itself contains from about 4 to about 20, preferably from about 6 to about 15 carbon atoms, sometimes also referred as a polyfluorinated monomer. Polymers with sufficiently high surface concentrations of fluorogroups (e.g. $CF_3$) have low surface energies.

Preferred fluorinated monomers include 2-(N-ethyl-perfluorooctanesulfonamido)-ethylacrylate (FX-13), 2-(N-ethyl-perfluoro-octanesulfonamido)ethyl methacrylate (FX-14), 2,2,2-trifluoroethyl methacrylate (TEM), 1,1-dihydroperfluoroethylacrylate, 1H,1H,7H-dodecafluoroheptyl acrylate (DFHA), hexafluoroisopropyl acrylate, 1H,1H,2H,2H-heptadecafluorodecyl acrylate, pentafluorostyrene (PFS), trifluoromethylstyrene, pentafluoroethyl acrylate, pentafluoroethyl methacrylate, hexafluoroisopropyl acrylate, hexafluoroisopropyl methacrylate (HFIPMA), methacrylate-functionalized fluorinated poly-ethylene oxides, and the like. A preferred fluorinated monomer containing 3 to about 20 fluorine atoms per monomer molecule is an amide or ester of acrylic acid or methacrylic acid. Particularly preferred fluorinated monomers containing 3 to about 20 fluorine atoms per monomer molecule are FX-13, FX-14 and 1H,1H,2H,2H-heptadecafluorodecyl acrylate that contain 13 or 14 carbon atoms and PFS and HFIPMA that contain six to eight carbon atoms. The most preferred of these monomers are 2,2,2-Trifluorethylacrylate, perfluorocyclohexylmethacrylate, 1H,1H,5H-octafluoropenylmethacrylate, 1H,1H,7H-dodecafluorheptylacrylate FX-13, and FX-14 that are sulfonamido ethyl esters of acrylic acid or methacrylic acid.

Nearly any hydrophilic vinylic monomer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1, 1dimethyl-3-oxobutyl)acrylamide, acrylic acid, and methacrylic acid.

Any know suitable vinylic monomer containing at least one functional group can be used as functionalizing vinylic monomer in the present invention. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchloride.

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any silicone-containing monomers can be used in the invention. Examples of silicone-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, monoacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, and tristrimethylsilyloxysilylpropyl methacrylate (TRIS), N-[tris(trimethylsiloxy)silylpropyl]methacrylamide ("TSMAA"), N-[tris(trimethylsiloxy)silylpropyl]acrylamide ("TSAA"), 2-propenoic acid, 2-methyl-,2-hydroxy-3-[3-[1,3,3,3-tetramethyl-1-[(trimethylsilyl)oxy]disil oxanyl]propoxy]propyl ester (which can also be named (3-methacryloxy-2-hydroxypropyloxy)propylbis(trimethylsiloxy)methylsilane), (3-methacryloxy-2-hydroxypropyloxy)propyltris(trimethylsiloxy)silane, bis-3-methacryloxy-2-hydroxypropyloxypropyl polydimethylsiloxane, 3-methacryloxy-2-(2-hydroxyethoxy)propyloxy)propylbis(trimethylsiloxy)methyl-silane, N,N,N',N'-tetrakis(3-methacryloxy-2-hydroxypropyl)-alpha,omega-bis-3-aminopropyl-polydimethylsiloxane, polysiloxanylalkyl (meth)acrylic monomers, silicone-containing vinyl carbonate or vinyl carbamate monomers (e.g., 1,3-bis[4-vinyloxycarbonyloxy)but-1-yl]tetramethyl-disiloxane; 3-(trimethylsilyl), propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy) silyl]propyl vinyl carbonate, t-butyldimethylsiloxyethyl vinyl carbonate; trimethylsilylethyl vinyl carbonate, and trimethylsilylmethyl vinyl carbonate). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane. Monomethacrylated or monoacrylated polydimethylsiloxanes of various molecular weight could be used. Difunctional macromers cause cross-linking during polymerization. Dimethacrylated or Diacrylated polydimethylsiloxanes of various molecular weights are less preferred for binder production. The presences of Idimethacrylated or diacrylated polydimethylsiloxanes during binder preparation will lead to cross-linking unless the polymerization is terminated at relatively low conversion. If desired, dimethacrylated or diacrylated polydimethylsiloxanes can be blended with ink or ink binder copolymer after the binder polymerization has been terminated. For photo-curable binder polymer, the silicon containing monomers used in the preparation of binder polymer will preferably have good hydrolytic (or nucleophilic) stability.

Any know suitable silicone-containing macromer can be used to prepare a fluorine-containing copolymer with pendant functional groups. A particularly preferred silicone-containing macromer is selected from the group consisting of Macromer A, Macromer B, Macromer C, and Macromer D described in U.S. Pat. No. 5,760,100, herein incorporated by reference in its entirety. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

A chain transfer agent may comprise one or more thiol groups, for example two or most preferably one thiol group. Suitable chain transfer agents include organic primary thiols or mercaptans having a further functional group such as, for example, hydroxy, amino, N—$C_1$-$C_6$-alkylamino, carboxy or a suitable derivative thereof. A preferred chain transfer agent is a cycloaliphatic or preferably aliphatic thiol having from 2 to about 24 carbon atoms and having a further functional group selected from amino, hydroxy and carboxy; accordingly, the preferred chain transfer agents are aliphatic mercapto carboxylic acids, hydroxymercaptans or aminomercaptans. Examples of particularly preferred chain transfer agents with a functional group are thioglycolic acid, 2-mercaptoethanol, ethanedithiol, propanedithiol, and 2-aminoethane thiol (cysteamine). In the case of an amine or a carboxylic acid, the chain transfer agent may be in the form of the free amine or acid or, preferably, in form of a suitable salt thereof, for example a hydrochloride in case of an amine or a sodium, potassium or amine salt in case of an acid. An example for a chain transfer agent having more than one thiol group is the reaction product of one equivalent of diethylene triamine with about two equivalents of γ-thiobutyrolactone.

In accordance with the invention, the polymerizable composition for preparing fluorine-containing copolymer with pendant functional groups can optionally include other components, such as, for example, one or more hydrophobic vinylic monomers, a crosslinking agent.

In accordance with the present invention, an actinically-curable fluorine-containing copolymer is obtained by reacting a fluorine-containing copolymer having pendant functional groups with an ethylenically functionalizing agent which comprises an ethylencially unsaturated group and a group capable of reacting with one of the functional groups of the fluorine-containing copolymer to form covalent linkages. It is well known in the art that a pair of suitable functional groups can form a covalent bond or linkage under known reaction conditions, such as, oxidation-reduction conditions, dehydration condensation conditions, addition conditions, substitution (or displacement) conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, a hydroxyl, amino (primary or secondary) or acid group is covalently bondable with isocyanate group: an amino group is covalently bondable with aldehyde (Schiff base which is formed from aldehyde group and amino group may further be reduced); and a hydroxyl or amino group is covalently bondable with carboxyl group.

Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Scheme 1 illustrates a two stage process for preparing a preferred actinically-curable fluorine-containing copolymer of the invention. In the first stage, a copolymerization reaction is initiated by heat in a polymerizable composition which includes a solvent (e.g, ethylacetate), a thermal initiator (e.g., AIBN), a chain transfer agent (e.g., 2-mercaptoethanol), a hydrophilic vinylic monomer devoid of functional groups (e.g. DMA), a vinylic monomer having at least one functional groups (e.g. HEMA, MAA, or glycidylmethacrylate), an alkoxysilane monomer (e.g. TRIS), monomethacrylated polydimethylsiloxane, and a fluorine-containing vinylic monomer (e.g. 1H,1H,7H-dodecafluoroheptylacrylate). It is understood that the copolymerization can be initiated with either heat or UV light. In the second stage of the process, the silicone-containing polymer is converted to an actinically-curable fluorine-containing copolymer.

Scheme I

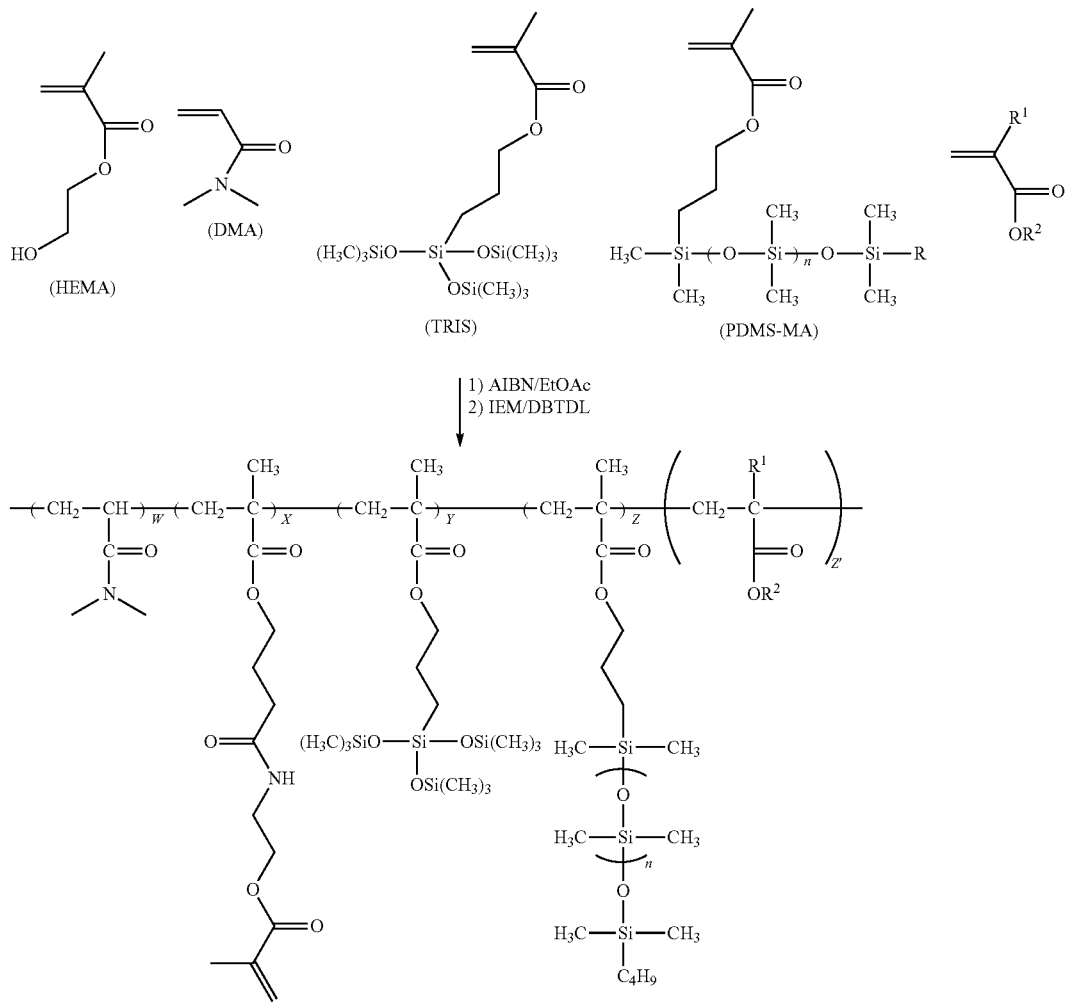

Abbreviations of materials listed in the Scheme are: DMA=N,N-dimethylacrylamide; HEMA=2-Hydroxyethylmethacrylate; TRIS=3-methacryloxypropyl-tris(trimethylsiloxy)silane; PDMS-MA=Monomethacryloxypropyl terminated polydimethylsiloxane (e.g MCR-M17 available from Gelest Corporation); IEM=2-isocyanatoethylmethacrylate; EtOAc=ethyl acetate; DBTDL=Dibutyltindilaurate; AIBN=2,2'-azobis(isobutyronitrile); $R^2$=linear, branched or cyclic perfluoroalkyl group or partially fluorinated alkyl group (e.g., $-CH_2C_nF_{2n+1}$); $R^1$ is hydrogen or methyl.

An ink of the invention typically comprises a solvent, a colorant, and an actinically-curable fluorine-containing copolymer of the invention (see supra) as a binder polymer.

A solvent can be water, an organic or inorganic solvent, a mixture of several organic solvents, or a mixture of water and one or more water soluble or water miscible organic solvents. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, 2-ethyoxyethanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethyl lactate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

Non-Pearlescent Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art. In the case of pearlescent pigments it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

The ink of the invention can further comprise polymerizable components such as DMA, TRIS, and PDMS-MA (monomethacryloxypropyl-terminated polydimethylsiloxane) in order to enhance its compatibility with silicone hydrogels. The percentage of polymerizable monomer or macromer in the binder is expected to effect ink and binder properties (e.g. viscosity, cure, swelling characteristics, strength of cured ink). The percentage of such materials relative to binder copolymer can be adjusted by directly adding such materials to finished binder copolymer. Alternatively, one could terminate the binder polymerization at low monomer conversion.

The ink of the invention can also be cured with the aide of a thermal initiator or preferably a photoinitiator. Any suitable photoinitiators can be used in the ink formulations. Examples of photoinitiators include but are not limited to Irgacure 2959, Irgacure 907, Irgacure 500, Irgacure 651, Irgacure 369, Daracure 1173, and Daracure 4265. In addition, combinations of initiators can be used. Pigments in ink formulations can block or reduce the amount of UV light that reaches photo-curable groups in ink formulations thereby reducing cure speed. Photo-initiators that have a broad UV absorption spectrum can be used to help alleviate such problems. For example Irgacure 907 and Irgacure 369 have strong UV absorption in longer UV regions and are effective in curing dark inks. Irgacure and Darcure initiators are available from CIBA specialty chemicals. Additional initiators include VAZO-52, VAZO-64, VAZO-67, and VAZO 88. Photosensitizers can also be added to an ink to facilitate photocuring of the ink.

The kinetics of ink curing can be tuned by varying the amount and type of ethylenically unsaturated groups in the binder polymer. For example, increasing the amount of methacrylate groups in the binder polymer will decrease the time required for an ink to gel under a given set of cure conditions. The reactivity of a binder polymer with a given amount of ethylenically unsaturated groups can be increased by using acrylate groups rather than methacrylate groups.

In accordance with the invention, the amount of ethylenically unsaturated groups in a fluorine-containing binder copolymer must be sufficiently high to ensure that the fluorine-containing binder copolymer can be crosslinked actinically or thermally to form a colorant-entrapping polymer network capable of entrapping the colorant in the ink without any adhesion promoters present in an ink.

By changing the amount of ethylenically unsaturated groups in a binder polymer, one can also control the modulus of a cured ink (i.e., a colored coat or film) on a silicone hydrogel contact lens. For example, decreasing the amount of ethylenically unsaturated groups in a binder polymer will allow the ink modulus to be lowered. This feature will allow some degree of control over effects of a cured ink upon the modulus of a colored silicone hydrogel contact lens. Other properties (including modulus) of the ink can be tuned by adjusting the ratio of hydrophilic and hydrophobic components, ratio of initiator, and the ratio of chain transfer agent in the binder polymer formulation. Such adjustments allow for a better property match between the ink and lens, for example, such as swelling characteristics.

The ink of the invention can further comprise one or more components selected from the group consisting of a thermal initiator, a photoinitiator, a surfactant, a humectant, antimicrobial agents, antioxidant agents, anti-coagulating agents, and other additives known in the art.

The ink of the invention can optionally but preferably does not comprise an adhesion promoter. An adhesion promoter may shorten the shelf life of the ink and thus it is not desirable for use in an industrial setting. An "adhesion promoter" refers to a compound (or crosslinker) which comprises two or more functional groups and is not a polymer or copolymer. A crosslinker molecule can be used to crosslink two or more monomers or polymer molecules. Many different crosslinking reactions could be used to cause chemical bonding between different binder polymer molecules to entrap the pigmented particles. Most crosslinkers are identified by bi- or multi-functional reactive groups. For example, diphenolic, diepoxide (e.g., bisphenol, diepoxide or epichlorhydrin), dimelamine, diisocyanate (e.g., hexamethylene diisocyanate (HMDI), 2,4-toluene diisocyanate, or bis(isocyanato phenyl) methane), or dialdehyde resins or resins with multiple mixed functional groups could be used. Exemplary crosslinkers with multi-functional groups include without limitation multi-functional phenolics with structures of $(HOH_2CPh)_n$-$R_g$; multi-functional epoxides with structures of $(CH_2OCH)_n$—$R_g$; multi-functional aldehydes with structure of $(HCO)_n$—$R_g$ or $(CH_3CO)_n$—$R_g$; multi-functional isocyanates with the structure of $(OCN)_n$—$R_g$; melamine resins with the structure of $(HOH_2C\text{-}MeI)_n$—$R_g$, where Ph is a phenol group and $R_g$ may be a aliphatic, alicyclic, aliphatic-alicyclic, aromatic, aliphatic-aromatic hydrocarbon, vinyl alcohol, vinyl butyral, or vinyl acetate, and n is a number greater than 1.

In accordance with the invention, a diluent can be a solvent or a solution of one or more vinylic monomers.

In a preferred embodiment of the invention, an ink of the invention comprises: a solvent in an amount of from about 10% and 99% by weight, preferably from about 20% and 95% by weight, more preferably from about 30% and 80% by weight; an actinically-curable fluorine-containing copolymer of the invention in an amount of from about 1% to about 90% by weight, preferably from about 10% to about 80% by weight, more preferably from about 25% to about 75% by weight; a colorant in an amount of from about 0.0 to about 25% by weight, preferably from about 0.05% to about 20% by weight, more preferably from about 0.1% to 15% by weight; and a polymerization initiator in an amount of from about 0 to about 5% by weight, preferably from about 0.02% to about 2.5% by weight, more preferably from about 0.05% to 2.0% by weight.

In accordance with the invention, an ink of the invention can be cured actinically or thermally to form a colored film on a molding surface of a mold. The colored film comprises the colorant-entrapping polymer network and the colorant entrapped therein, and is characterized by having an increased durability in a solvated state in a silicone-hydrogel lens formulation in relation to a control colored film obtained from a control ink including an actinically-curable fluorine-free binder copolymer.

The colored film also has good adhesion to the contact lens without being covalently attached to the lens material of the contact lens. It is believed that the lens material upon curing forms an IPN with the cured or partially cured ink film.

Although the inks disclosed here are designed for use with silicone hydrogel lenses, they could be used with non-silicone hydrogels of appropriate composition (e.g. low water content formulations).

The invention also provides a method for making a colored silicone hydrogel contact lens, comprising the steps of: (a) applying a color coat to at least a portion of at least one of molding surfaces of a lens mold with an ink comprising at least one colorant, a solvent, and a fluorine-containing binder copolymer, wherein the fluorine-containing binder copolymer comprises multiple ethylenically unsaturated groups, hydrophilic segments derived from one or more hydrophilic vinylic monomers, fluorine-containing segments derived from one or more fluorine-containing vinylic monomers, and silicone-containing segments derived from at least one first silicone-containing vinylic monomer or macromer, wherein the colored coat contains a first surface exposed to the interior of the lens-forming cavity and a second surface in contact with the molding surface; (b) curing the color coat to form a color film which comprises a colorant-entrapping polymer network and the colorant entrapped therein, wherein the amount of the ethylenically unsaturated groups in the fluorine-containing binder copolymer is high enough to ensure that the fluorine-containing binder copolymer can be crosslinked actinically or thermally to form the colorant-entrapping polymer network capable of entrapping the colorant; (c) dispensing a lens-forming material into the lens-forming cavity of the mold, wherein the lens-forming material comprises at least one second silicone-containing vinylic monomer or macromer or a silicone-containing prepolymer; and (d) curing the lens-forming material within the lens-forming cavity to form the silicone hydrogel contact lens, whereby the colored coat detaches from the molding surface and becomes integral with the body of the silicone hydrogel contact lens.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad: U.S. Pat. No. 4,460,534 to Boehm et al.; U.S. Pat. No. 5,843,346 to Morrill; and U.S. Pat. No. 5,894,002 to Boneberoer et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

An ink can be applied to a molding surface of a mold according to any printing technologies, such as, for example, pad transfer printing (or pad printing), or inkjet printing. It is understood that other types of printing technologies could also be used to print lenses and or molds.

In pad-transfer printing, a color image is placed or printed on a pad transfer device and the image on the pad transfer device is transferred to another surface, such as a polymer or lens (U.S. Pat. No. 3,536,386 to Spivack; U.S. Pat. No. 4,582,402 and U.S. Pat. No. 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art. Inks for pad printing operations will preferably have one or more of the following characteristics: viscosity lower than about 50,000 cps, preferably lower than about 5000 cps and most preferably below 1500 cps, particle size less than about 5 µm (for non-pearlescent pigment), surface tension from about 20 mN/m to about 60 mN/m; prolonged stability (i.e., stable for about 4 hours, preferably at least 8 hours, more preferably 24 hours, even more preferably at least 7 days, most preferably at least three weeks); an appropriate color level (visible by eye); good adhesion to medical devices; and good transfer from a mold to a medical device made in the mold. The physical stability of an ink could differ from its chemical stability. For example, pigments might settle from the ink (physical phenomenon) yet the ink may not have undergone any significant chemical reaction. For such situations the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

It should be understood that the inks and binder polymers of the invention can be used not only in pad printing operations but also in ink jet printing operations. However, formulation adjustment would likely be needed for ink jet printing operations. For ink jet applications, the ink of the invention has one or more of the following characteristics: a viscosity lower than about 50 centipoise (cps), preferably lower than about 15 cps; most preferably below 15 cps; a surface tension of from about 20 mN/m to about 60 mN/m; a particle size of less than about 5 µm; prolonged stability (i.e., stable for at about 4 hours, preferably at least 8 hours, more preferably at least 24 hours, even more preferably at least 7 days, most preferably at least three weeks); an appropriate color level (visible by eye): uniform drop formation (i.e., no "coffee stain" or "donut" effects); jet stability (i.e., ease of formation of individual drops); good adhesion to medical devices; good transfer from a mold to a medical device made in the mold; and stability of ink in inkjet nozzles (minimal drying or crusting effects).

"Coffee stain appearance" or "coffee stain effect", as used herein, means that a color dot on a contact lens or a mold has a peripheral edge having a dark color and the interior area having light color.

"Donut appearance" or "donut effect", as used herein, means that a color dot on a contact lens or a mold has a light-colored or colorless central zone surrounded by a dark-colored annular zone.

Printing a lens using an inkjet printing process is described in published US Patent Application Nos. 2001/0050753, 2001/0085934, 2003/0119943, and 2003/0184710, herein incorporated by references in their entireties.

In accordance with the invention, an ink of the invention can be applied on the molding surface of one or both mold portions by using pad transfer printing (or pad printing) to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens. However, there are special cosmetic effects achievable by providing a pattern on both the anterior and posterior surfaces of a contact lens. For instance, a colored pattern of one color can be applied to the molding surface defining the back surface of the lens (for instance, white) and the same or different colored pattern can be applied to the molding surface defining the front surface of the lens (for instance, dark blue). This then would result in a lens that could have either a multi-color textured appearance for extremely lifelike appearance, or a brighter tint using a white background to reflect back out at the observer.

If the lens is intended to be natural in appearance, the pattern applied to the lens preferably contains voids. Examples of such patterns are disclosed in U.S. Pat. No. 5,160,463 to Evans et al. and U.S. Pat. No. 5,414,477 to Jahnke (herein incorporated by reference in their entireties). Typically the voids comprise about 5 to about 80% of the pattern's area. On the other hand, it is preferred that the pattern occupy from 50% to all of the area of the lens in the iris region thereof (or that portion of the molding surface corresponding to the iris region of the lens). If the colorant is opaque, then only the portion of the lens corresponding to the iris is usually printed, leaving the pupil section clear or tinted. For lenses that are larger in diameter than the iris, the portion of the lens extending beyond the iris may be left unprinted. A person skilled in the art will know well how to design color patterns.

Optionally, a transferable clear coating can be applied to a molding surface of a mold before applying the ink by pad transfer or inkjet printing. A "transferable clear coating" is intended to describe a clear coating which can be detached from a molding surface of a mold and become integral with the body of a contact lens molded in the mold. A transferable clear coating can be applied to a molding surface of mold by any suitable techniques, such as, for example, spraying, printing, swabbing, spin coating or dipping. A transferable clear coating can be obtained by applying a coating of a solution which comprises polymerizable components, preferably an actinically-curable fluorine-containing copolymer of the invention and is free of colorant. For example, a transferable clear coating with substantially uniform thickness (less than 200 microns) can be prepared by spraying a molding surface with a solution having the composition (without colorant) of an ink to be used or a solution of an actinically-curable fluorine-containing copolymer of the invention or a lens-forming material to be used. This transferable clear coating can optionally be cured to form a transferable clear film (without any pigment but optionally with dyes including reactive dyes). One or more colored patterns can then be printed with an ink of the invention on this transferable coating or film. By applying a transferable clear coating before printing, one can make a colored lens in which printed colored patterns are imbedded just below a film derived from the transferable clear coating. Such lens may be more comfortable for wearing and have much less susceptibility to colorant leaching out of the colored lens.

The ink of the invention is actinically or thermally curable to form a colored film on a molding surface of a mold. It is desirable that the printed ink is cured actinically to an extent to minimize loss of pattern definition of the colored coat resulted from subsequent filling of a lens-forming material.

Any silicone hydrogel lens-forming materials can be used in the invention. Silicone hydrogel lens forming materials that are suitable in the fabrication of contact lenses are illustrated by numerous issued US patents and familiar to those skilled in the art. Preferred lens-forming materials are capable of forming hydrogels. A lens-forming material comprises one or more silicone-containing vinylic monomers or macromers or silicone-containing prepolymers, optionally one or more vinylic monomers and/or macromers and optionally further include various components, such as photoinitiator, visibility tinting agent, fillers, and the like.

In accordance with the invention, a silicone hydrogel lens-forming material comprises at least one silicon-containing monomer or macromer or a silicone-containing prepolymer, or can be any lens formulations for making silicone hydrogel contact lenses. Exemplary silicone hydrogel lens formulations include without limitation the formulations of lotrafilcon A, lotrafilcon B, etafilcon A, genfilcon A, lenefilcon A, polymacon, acquafilcon A, balafilcon, silicon-A and the like. A silicone hydrogel lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention comprises a silicone-containing macromer or a silicone-containing prepolymer.

Any suitable silicone-containing monomers can be used in the invention. Examples of silicone-containing monomers include, without limitation, those described above.

Any suitable silicone-containing (or siloxane-containing) macromer with one or more ethylenically unsaturated groups can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be altered.

A silicone hydrogel lens-forming material can further comprise an antimicrobial agent, preferably antimicrobial metal nanoparticles, more preferably silver nanoparticles.

In accordance with the present invention, a silicone hydrogel lens-forming material can further comprise various components, such as cross-linking agents, a chain transfer agent, initiator, UV-absorbers, inhibitors, fillers, visibility tinting agents (e.g., dyes, pigments, or mixtures thereof), and the like, as known to a person skilled in the art.

In accordance with the present invention, a silicone hydrogel lens-forming material can be a solution or a solvent-free liquid or melt at a temperature below 90° C. A person skilled in the art will known well how to prepare silicone hydrogel lens-forming material.

In accordance with the present invention, a silicone hydrogel lens-forming material can be a solution or a solvent-free liquid or melt at a temperature below 60° C.

A lens-forming material is dispensed in the mold according to any method known to a person skilled in the art. The lens-forming material is preferably allowed to pentrate into the cured ink (the colored film) and then be cured to form a colored contact lens onto which the color film is transferred from the mold.

Without limiting this invention to any particular mechanism or theory, it is believed that the lens material of a silicone hydrogel lens and the crosslinked fluorine-containing binder copolymer of the invention form interpenatrating networks (IPN's), because the lens material (polymer or polymers) of the colored contact lens is polymerized or crosslinked in the presence of a polymer (i.e., crosslinked binder copolymer in the ink). Adhesion of an ink of the invention to the lens by IPN formation does not require the presence of reactive functional groups in the lens polymer.

It is understood that adhesion between lenses and ink could occur by mechanisms other than IPNs. Where lens materials contain certain types of functionality, direct linkage (bond formation) between binder copolymer and lens polymer is possible. For example, lens polymer that contains UV-curable groups (e.g. residual vinyl functionality, latent vinyl functionality) would enhance direct linkage of photo-curable ink binder to the lens polymer. For this reason, it might be desirable to partially cure the binder polymer prior to casting of lens formulation. Residual vinyl functionality in the binder polymer would then be available for direct linkage with lens monomer or macromer. The durability of partially cured ink binder might be less than that of fully cured ink binder. Nucleophilic addition reactions would also provide another mode of linking ink binder to lenses. For example, lenses that contain nucleophilic groups (e.g. R—SH) could undergoe Michael addition reactions with pendant methacrylate groups in binder polymer. Alternatively binder polymer containing nucleophilic groups (e.g. RSH, $NHR^*_2$, R=Alkyl, $R^*$=H, Alkyl) could undergo Michael addition reactions with lens polymer that contains groups such as acrylate or methacrylate. Such reactions would bond the ink to the lens. Furthermore, binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer. For example, one could prepare a curable silicone hydrogel ink binder by copolymerizing DMA with TRIS, glycidlymethacrylate, monomethacrylated polydimethylsiloxane and 2-(dimethylamino)ethylacrylate. Under appropriate conditions, the dimethylamino functional groups will react with epoxy functionality in the resulting binder polymer.

As such, an ink of the present invention has a good transferability from a mold to a contact lens. A "good transferability from a mold to a contact lens" in reference to an ink means that a color image printed on a molding surface of a mold with the ink can be transferred completely onto a contact lens cured in that mold. The ink will also have good transferability from a cliché to a print pad and from a print pad to a lens mold or lens. The composition of the ink, solvent type, binder composition, molecular weight of binder polymer, molecular weight distribution of binder polymer, print pad (type of rubber and printing speed), and the nature of the lens and lens mold surfaces will have an impact on print quality. For example, in processes where printing speed is relatively slow and an inked cliché is exposed to air for relatively long cycle time it will be desirable to have inks in solvents with relatively high boiling points. The high boiling point solvents will minimize premature drying of inks in clichés. For printing directly on contact lenses, the use of relatively high boiling point solvents in ink formulations might be preferred. Solvents that also cause the lens to swell to some extent might be preferred for use in inks. Swelling of a lens by an ink solvent is expected to improve penetration of ink into the lens. Good penetration of an ink into a lens followed by curing is expected to enhance adhesion characteristics of the ink to the lens.

The ink of the present invention also has good adhesion to a contact lens, preferably to a silicone hydrogel contact lens. As used herein, "good adhesion to a contact lens or a silicon hydrogel contact lens" in reference to an ink means that the colored prints generated on the lens with the ink can pass at least a finger rubbing test, preferably pass the finger rubbing test and a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

The sonication-in-methanol (or other suitable solvent, e.g., such as isopropanol) test is performed as follows. A colored contact lens is immersed in 5 ml of, for example, methanol or isopropanol or a suitable solvent, sonicated for about 1 minute and then placed in a vial containing borate buffered saline (BBS) or phosphate buffered saline (PBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

In another preferred embodiment, where a lens-forming material is a solution (dissolved in water, a mixture of water and a water miscible organic solvent, or an organic solvent), solvent-free liquid, or melt of one or more silicone-containing prepolymers with ethylenically unsaturated groups optionally in presence of other components, reusable molds are used and the lens-forming material is cured actinically under a spatial limitation of actinic radiation to form a contact lens. Examples of silicone-containing prepolymers include without limitation those disclosed in US Patent Application Publication No. US 2001-0037001 A1 and U.S. Pat. No. 6,039,913, which are incorporated herein by references in their entireties. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. In this preferred embodiment, preferably the lens-forming material is substantially free of vinylic monomers and the silicone-containing prepolymer is substantially purified prior to making the lens-forming material (formulation). As such, no extraction step is necessary after cast-molding step and the production cost can be reduced.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively of the uncrosslinked prepolymer and other residues, using water or a suitable solvent, and can be dried with air. Reusable molds can also be made of cyclic olefin polymers or copolymers, such as, for example, Topas® (clear amorphous copolymer of ethylene and norbornene) from Ticona GmbH of Frankfurt, Germany and Summit, N.J., or Zeonex® or Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

An ink of the invention can also be used to print a color image directly on a preformed silicone hydrogel contact lens to produce a colored contact lens. The printed ink is allowed to penetrate at least partially into the lens material of a contact lens and then cured (cross-linked). The curing can be activated by UV radiation or heat. The binder polymer in the ink is crosslinked in the presence of the lens material of the silicone hydrogel to form IPNs.

Although this invention is mainly concerned with ink binder polymers for use with silicone hydrogel lenses, the concepts and materials described here can also be applied to the production of non-silicone hydrogel colored contact lens products. Furthermore, the copolymers disclosed here could also be used as contact lens materials.

An actinically-curable fluorine-containing copolymer of the invention can also find use as a lens-forming material in producing silicone hydrogel lenses for daily wear or extended wear modality, which is also an aspect of the invention. Use of fluoro-containing copolymer of the invention in silicone hydrogel lens-forming materials may provide one or more of the following advantages: increasing tensile strength and toughness of resultant lenses; and increasing durability and Dk.

In addition, the actinically-curable fluorine-containing copolymer of the invention could also find use as intraocular lenses (IOL's), medical coatings (e.g. coatings for syringe needles, catheters), wound treatment, breathable paints, and breathable coatings. Improved breath ability in paints would likely decrease blistering and/or peeling due to moisture migrating out of wood or other surfaces.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

Example 1

This example describes synthesis of a precursor to a photo-curable binder polymer and synthesis of a photo-curable binder polymer.
Preparation of a Fluorine-Containing Copolymer (1600-53-1)

AIBN (0.8178 grams) is dissolved in DMA (158.54 grams), and then charged into a 1-liter glass-jacketed reaction kettle. The kettle is then charged with TRIS (100.81 grams), monomethacryloxypropyl terminated polydimethylsiloxane (60.21 grams) (Gelest brand, MCR-M17, MW~5000), HEMA (40.20 grams), MMA (18.25 grams), 2-mercaptoethanol (1.0201 grams), 1,1-dihydroperfluoroethylacrylate (21.80 grams), and ethyl acetate (600 mL). The reaction kettle is equipped with a condenser, nitrogen inlet/outlet, and a stirring shaft/propeller system connected to an overhead stirring motor. Nitrogen is bubbled through the mixture for about 30 minutes at room temperature and then the mixture is heated to about 40° C. and stirred under nitrogen at about 300 RPM. The polymerization mixture is inhibited with 36.9 mg of 4-hydroxyTEMPO (dissolved in~10 mL of ethyl acetate) after about 48 hours of reaction at 40° C.
Preparation of Actinically-Curable Fluorine-Containing Copolymer (1600-54).

A solution consisting of 2-isocyanatoethylmethacrylate (14.3897 grams) and dibutyltindilaurate (0.2532 grams) is added to a solution of the fluorine-containing copolymer prepared above (1600-53-1). The resulting mixture is then heated at 40° C. for about 4 hours. Ethyl acetate is removed from the resultant copolymer by rotary evaporation and exchanged with ethanol.
Photo-Cure Testing:

A solution containing about 50 weight percent actinically-curable copolymer (1600-54), 0.25 weight percent Daracure 1173 and ethanol is used to prepare hydrogel lenses. Polypropylene lens molds are filled with the copolymer solution and then UV cured (UVA) at about 3.5 Mw/cm² for about 30 minutes and hydrogel lenses are obtained. Lenses are extracted in Isopropanol and then with water. The fluorine containing hydrogels are judged to be mechanically more durable in IPA than lenses made from similar hydrogel formulations that do not contain fluorine units. Lens diameters in water are about 13.65 mm in water and about 19.13 mm in isopropanol. The lens holds its shape even when it is in a highly swollen state from isopropanol exposure.

Ink from Copolymer (1600-54).

Ink produced form binder polymer 1600-54 does not show smearing after the cured inks on molds are exposed to lotrafilcon B formulation and then closed using an automatic mold closing machine.

Example 2

Preparation of a Fluorine-Containing Copolymer (1600-52-1)

AIBN (0.8072 grams) is dissolved in DMA (152152.21 grams), and then charged into a 1-liter glass-jacketed reaction kettle. The kettle is then charged with TRIS (100.21 grams), monomethacryloxypropyl terminated polydimethylsiloxane (60.06 grams) (Gelest brand. MCR-M17, MW~5000), HEMA (40.09 grams), MMA (12.21 grams), 2-mercaptoethanol (1.0331 grams), 1H, 1H, 7H-dodecafluoroheptyl acrylate (6.96 grams), and ethyl acetate (600 mL). The reaction kettle is equipped with a condenser, nitrogen inlet/outlet, and a stirring shaft/propeller system connected to an overhead stirring motor. Nitrogen is bubbled through the mixture for about 30 minutes at room temperature and then the mixture is heated to about 40° C. and stirred under nitrogen at about 300 RPM. The polymerization mixture is inhibited with 38.9 mg of 4-hydroxyTEMPO (dissolved in~10 mL of ethyl acetate) after about 48 hours of reaction at 40° C.
Preparation of Actinically-Curable Fluorine-Containing Copolymer (1600-55).

A solution consisting of 2-isocyanatoethylmethacrylate (14.3312 grams) and dibutyltindilaurate (0.2645 grams) is added to the copolymer solution (1600-52-1) from above. The resulting mixture is then heated at 40° C. for about 4 hours. Ethyl acetate is removed from the copolymer by rotary evaporation and exchanged with ethanol.
Photo-Cure Testing:

A solution containing about 50 weight percent copolymer (1600-55), 0.25 weight percent Daracure 1173 and ethanol is used to prepare hydrogel lenses. Polypropylene lens molds are filled with the polymer solution and then UV cured (UVA) at about 3.5 Mw/cm² for about 30 minutes and hydrogel lenses are obtained. Lenses are extracted in Isopropanol and then with water. The fluorine containing hydrogels are judged to be mechanically more durable in IPA than similar hydrogel formulations that do not contain fluorine units. Lens diameters are about 14.15 mm in water and about 20.24 mm in isopropanol.

Example 3

Preparation of a Fluorine-Containing Copolymer (1600-80-1)

AIBN (0.8691 grams) is dissolved in DMA (158.54 grams), and then charged into a 1-liter glass-jacketed reaction kettle. The kettle is then charged with TRIS (96.82 grams), monomethacryloxypropyl terminated polydimethylsiloxane (57.20 grams) (Gelest brand, MCR-M17, MW~5000), HEMA (38.45 grams), MMA (17.60 grams), 2-mercaptoethanol (1.0617 grams), 1H,1H-octafluoropentyl methacrylate (22.01 grams), and ethyl acetate (600 mL). The reaction kettle is equipped with a condenser, nitrogen inlet/outlet, and a stirring shaft/propeller system connected to an overhead stirring motor. Nitrogen is bubbled through the mixture for about 30 minutes at room temperature and then the mixture is heated to about 40° C. and stirred under nitrogen at about 300

RPM. The polymerization mixture is inhibited with 41 mg of 4-hydroxy-TEMPO after about 48 hours of reaction at 40° C.
Preparation of Actinically-Curable Fluorine-Containing Copolymer (1600-80-2).

A solution consisting of 2-isocyanatoethylmethacrylate (13.8010 grams) and dibutyltindilaurate (0.2395 grams) is added to the copolymer solution (1600-80-1) from 3 above. The resulting mixture is then heated at 40 deg-C. for about 4 hours. Ethyl acetate is removed from the copolymer by rotary evaporation and exchanged with ethanol.

Ink Preparation from Binder Polymer 1600-80-2
Black Ink (1600-90-1):

10.534 grams of a 64% solution of copolymer 1600-80-2 (from example 3 above) is mixed with Daracure 4265 (0.3035 grams), 2.8448 grams of black ink paste, and 1.33 grams of ethanol. Black ink paste is prepared by combining 130 grams of iron oxide black, 130 grams of ethanol and 452 grams of grinding media in a ceramic roller jar. The sample is milled for about 24 hours on a roller mill. The percent solids in the paste is then determined gravimetrically.

Hazel Ink (1600-90-2):

10.58 grams of a 64% solution of copolymer 1600-80-2 (from example 3 above) is mixed with Daracure 4265 (0.3077 grams), 1.9522 grams of hazel ink paste (% in ethanol), and 2.20 grams of ethanol. Hazel ink paste is prepared by combining about 0.72 grams of PCN-blue, 8.55 grams of titanium oxide, 21.48 grams of iron oxide red, 60.24 grams of iron oxide yellow, 169 grams of ethanol and 451 grams of grinding media in a ceramic roller jar. The pigment mixture is milled for about 24 hours. The percent solids in the paste is then determined gravimetrically.

Green Ink (1600-90-3):

10.55 grams of a 64% solution of copolymer 1600-80-2 (from example 3 above) is mixed with Daracure 4265 (0.3050 grams), 1.9032 grams of green ink paste (% in ethanol), and 2.27 grams of ethanol.

Green ink paste is prepared by combining about 129.5 grams of chromium oxide with 0.55 grams of PCN-Blue, 130 grams of ethanol and about 449 grams of grinding media in a ceramic roller jar. The pigment mixture is milled on roller mill for about 24 hours. The percent solids in the paste is then determined gravimetrically.

Preparation of Colored Silicone Hydrogel Lenses Using Inks from Example 3:

Inks are printed on corona treated front curve O2OPTIX™ molds. The inks are then cured at 254 nm for 30 minutes using a hand held UV light source (UVP, model UVLS-28) at a distance of about 1.5 inches. After curing, the molds are filled with lotrafilcon B lens formulation and then closed using an O2OPTIX™ automatic mold closing apparatus. The lens formulations are then cured by placing the filled molds under UVA lights (30 minute cure at about 4.5 mW/cm$^2$). Molds are opened and lenses are extracted in isopropanol (~30 minutes) and then re-equilibrated in distilled water. Spherical lenses with good print quality are obtained.

Examples 4-42

Binder Polymers Examples 4-42

Additional copolymers are prepared by procedures similar to those described in examples 1-3. Copolymer compositions, properties, polymerization times, polymerization conditions (temperature, polymerization time, solvent) are summarized in Tables 1-12. Polymerization reactions are carried out on about a 400 gram scale as noted in Tables 1-12.

Binder Polymers in examples 10, 11, 12, 13, 14, 15 are prepared in a slit batch process.

This is done by polymerizing about 484 grams monomer in about 750 mL of solvent in stage 1 of the operation. Copolymer solutions are stabilized with 4-HydroxyTEMPO, and Copolymer solution mass is adjusted to a total mass of about 1600 grams with the addition of ethyl acetate. Copolymer solution is divided into two equal portions and converted to photo-curable copolymer through reaction with IEM.

TABLE 1

Copolymer Formulations and properties

| | Binder Polymers Example Numbers | | | |
|---|---|---|---|---|
| | 1 | 2 | 3 | 4 |
| | Ref Numbers | | | |
| Material | 1600-54-1 Wt % | 1600-55-1 Wt % | 1600-80-2 Wt % | 1600-65-2 Wt % |
| DMA | 38.11 | 38.13 | 38.038 | 38.27 |
| TRIS | 24.23 | 24.16 | 24.159 | 24.33 |
| HEMA | 9.66 | 9.67 | 9.632 | 9.73 |
| MMA | 4.39 | 2.94 | 4.372 | 3.58 |
| 2,2,2-trifluoroethyl acrylate (DHPFEA) | 5.24 | | | 0.00 |
| 2,2,2-trifluoroethyl methacrylate (DHPFEA) | | | | |
| 1H,1H,7H-dodecafluroheptyl acrylate | 0.00 | | 0.000 | 0.00 |
| Hexafluroisopropyl methacrylate | | | 0.000 | 6.08 |
| Perfluorcyclohexyl methacrylate | | | | |
| 1H,1H,heptafluorbutyl acrylate | | | | |
| 1H,1H,5H-octafluoropentyl methacrylate | | | 5.480 | |
| 1H,1H,7H-dodecafluroheptyl methacrylate | | | | |
| 1H,1H,7H-dodecafluroheptyl acrylate | | 6.72 | | |
| 1H,1H-perfluorooctyl acrylate | | | | |
| PDMS-MA (MCR-M17) | 14.47 | 14.48 | 14.423 | 14.52 |
| VAZO-52 | | | | |

TABLE 1-continued

Copolymer Formulations and properties

| | Binder Polymers Example Numbers | | | |
|---|---|---|---|---|
| | 1 | 2 | 3 | 4 |
| | Ref Numbers | | | |
| Material | 1600-54-1 Wt % | 1600-55-1 Wt % | 1600-80-2 Wt % | 1600-65-2 Wt % |
| AIBN | 0.20 | 0.19 | 0.197 | 0.20 |
| 2-mercaptoethanol | 0.25 | 0.25 | 0.248 | 0.25 |
| Stage-1, free radical polymerization | | | | |
| Stage-2, conversion to photopolymer with IEM | | | | |
| IEM | 3.46 | 3.45 | 3.452 | 3.05 |
| Total (catalyst and solvent not included) | 100.0 | 100.0 | 100.0 | 100.0 |
| Reaction Parameters | | | | |
| Total Monomer charge excluding IEM, relevant to split batch | N/A | N/A | N/A | N/A |
| Total Monomer charge including IEM (grams) | 416.0 | 415.0 | 400.0 | 414.0 |
| Volume of solvent (mL) | 600 | 600 | 600 | 600 |
| Polymerization Temperature, stage 1 (deg-C.) | 40 | 40 | 40 | 40 |
| Polymerization time, stage 1 (hrs) | 48 | 48 | 48 | 48 |
| Polymerization Solvent | EtOAc | EtOAc | EtOAc | EtOAc |
| Grams DBTDL (catalyst), stage 2 reaction at ~40° C. | 0.253 | 0.264 | 0.240 | 0.208 |
| milligrams of 4-hydroxyTEMPO (Added at stage 2 of reaction) | 37 mg | 39 mg | 41 mg | 39 mg |
| Properties | | | | |
| Viscosity in centipoise of 50% Solution at 25 deg-C. | 544 | 32 | 242 | 468 |
| MW | 268635 | 443060 | 64178 | 91169 |
| Mn | 57684 | 45179 | 26822 | 32083 |
| Mw/Mn (polydispersity) | 4.66 | 9.81 | 2.39 | 2.84 |

TABLE 2

Copolymer Formulations and properties

| | Binder Polymer Example Numbers | | | |
|---|---|---|---|---|
| | 5 | 6 | 7 | 8 |
| | Ref Numbers | | | |
| Material | 1600-68-2 Wt % | 1600-72-2 Wt % | 1600-74-2 Wt % | 1600-79-2 Wt % |
| DMA | 37.75 | 38.038 | 37.991 | 38.038 |
| TRIS | 26.61 | 24.159 | 24.155 | 24.159 |
| HEMA | 9.77 | 9.632 | 9.647 | 9.632 |
| MMA | | 4.372 | 0.000 | 4.372 |
| 2,2,2-trifluoroethyl acrylate (DHPFEA) | | 5.480 | 0.000 | |
| 2,2,2-trifluoroethyl methacrylate (DHPFEA) | | | | |
| 1H,1H,7H-dodecafluroheptyl acrylate | | 0.000 | 0.000 | 0.000 |
| Hexafluroisopropyl methacrylate | | 0.000 | 0.000 | 0.000 |
| Perfluorcyclohexyl methacrylate | | | 10.032 | |
| 1H,1H,heptafluorbutyl acrylate | | | | 5.480 |
| 1H,1H,5H-octafluoropentyl methacrylate | 7.78 | | | |
| 1H,1H,7H-dodecafluroheptyl methacrylate | | | | |
| 1H,1H,7H-dodecafluroheptyl acrylate | | | | |
| 1H,1H-perfluorooctyl acrylate | | | | |
| PDMS-MA (MCR-M17) | 14.54 | 14.423 | 14.450 | 14.423 |
| VAZO-52 | | | | |
| AIBN | 0.19 | 0.197 | 0.196 | 0.197 |
| 2-mercaptoethanol | 0.26 | 0.248 | 0.247 | 0.248 |
| Stage-1, free radical polymerization | | | | |
| Stage-2, conversion to photopolymer with IEM | | | | |
| IEM | 3.09 | 3.452 | 3.282 | 3.452 |
| Total (catalyst and solvent not included) | 100.0 | 100.0 | 100.0 | 100.0 |
| Reaction Parameters | | | | |
| Total Monomer charge excluding IEM, relevant to split batch | N/A | N/A | N/A | N/A |
| Total Monomer charge including IEM (grams) | 414.0 | 401.0 | 401.0 | 400.0 |
| Volume of solvent (mL) | 600 | 600 | 600 | 600 |

TABLE 2-continued

Copolymer Formulations and properties

| | Binder Polymer Example Numbers | | | |
|---|---|---|---|---|
| | 5 | 6 | 7 | 8 |
| | | Ref Numbers | | |
| Material | 1600-68-2 Wt % | 1600-72-2 Wt % | 1600-74-2 Wt % | 1600-79-2 Wt % |
| Polymerization Temperature, stage 1 (° C.) | 40 | 40 | 40 | 40 |
| Polymerization time, stage 1 (hrs) | 48 | 48 | 48 | 48 |
| Polymerization Solvent | EtOAc | EtOAc | EtOAc | EtOAc |
| Grams DBTDL (catalyst), stage 2 reaction at ~40° C. | 0.237 | 0.211 | 0.221 | 0.238 |
| milligrams of 4-hydroxyTEMPO (Added at stage 2 of reaction) | 36 mg | 38.0 | 39 mg | 40 mg |
| Properties | | | | |
| Viscosity in centipoise of 50% Solution at 25° C. | 68 | 6350 | 1030 | 2470 |
| MW | 58498 | 161683 | 110555 | 134515 |
| Mn | 24010 | 52130 | 33368 | 41816 |
| Mw/Mn (polydispersity) | 2.44 | 3.1 | 3.31 | 3.22 |

TABLE 3

Copolymer Formulations and properties

| | Binder Polymer Example Numbers | |
|---|---|---|
| | 9 | 10 Split batch after stage 1 |
| | Lot/Ref Numbers | |
| Material | 1600-81-2 Wt % | 1600-83-2 Wt % |
| DMA | 37.97 | 39.13 |
| TRIS | 24.11 | 20.71 |
| HEMA | 9.63 | 9.98 |
| MMA | 4.44 | 4.59 |
| 2,2,2-trifluoroethyl acrylate (DHPFEA) | 0.00 | 0.00 |
| 2,2,2-trifluoroethyl methacrylate (DHPFEA) | 0.00 | 0.00 |
| 1H,1H,7H-dodecafluroheptyl acrylate | 0.00 | 10.03 |
| Hexafluroisopropyl methacrylate | 0.00 | 0.00 |
| Perfluorocyclohexyl methacrylate | 0.00 | 0.00 |
| 1H,1H,heptafluorbutyl acrylate | 0.00 | 0.00 |
| 1H,1H,5H-octafluoropentyl methacrylate | 0.00 | 0.00 |
| 1H,1H,7H-dodecafluroheptyl methacrylate | 5.49 | 0.00 |
| 1H,1H,7H-dodecafluroheptyl acrylate | 0.00 | 0.00 |
| 1H,1H-perfluorooctyl acrylate | 0.00 | 0.00 |
| PDMS-MA (MCR-M17) | 14.37 | 15.01 |
| VAZO-52 | | |
| AIBN | 0.27 | 0.28 |
| 2-mercaptoethanol | 0.26 | 0.27 |
| Stage-1, free radical polymerization | | |
| Stage-2, conversion to photopolymer with IEM | | |
| IEM | 3.45 | 3.59 |
| Total (catalyst and solvent not included) | 100.0 | 100.0 |
| Reaction Parameters | | |
| Total Monomer charge excluding IEM, relevant to split bactch | N/A | 483.3 |
| Total Monomer charge including IEM (grams) | 401.0 | N/A |
| Volume of solvent (mL) | 600.0 | 750.0 |
| Polymerization Temperature, stage 1 (deg-C.) | 40.00 | 40.00 |
| Polymerization time, stage 1 (hrs) | 48.00 | 48.00 |
| Polymerization Solvent | EtOAc | EtOAc |
| Grams DBTDL (catalyst), stage 2 reaction temp ~40 deg-C. | 0.242 | 0.165 (after spliting batch) |
| milligrams of 4-hydroxyTEMPO (Added at stage 2 of reaction) | 40 mg | 54 mg for total batch |
| Properties | | |
| Viscosity in centipoise of 50% Solution at 25 deg-C. | 1180 | 1820 |
| MW | 114203 | 106648 |
| Mn | 33847 | 34468 |
| Mw/Mn (polydispersity) | 3.37 | 3.09 |

TABLE 4

Copolymer Formulations and properties

| | Binder Polymer Example Numbers | |
|---|---|---|
| | 11<br>Spilt batch | 12<br>Split batch |
| | Lot/Ref Numbers | |
| Material | 1600-84-2<br>Wt % | 1600-85-2<br>Wt % |
| DMA | 37.49 | 37.49 |
| TRIS | 19.53 | 19.99 |
| HEMA | 9.63 | 9.62 |
| MMA | 4.42 | 4.42 |
| 2,2,2-trifluoroethyl acrylate (DHPFEA) | | |
| 2,2,2-trifluoroethyl methacrylate (DHPFEA) | | |
| 1H,1H,7H-dodecafluroheptyl acrylate | | |
| Hexafluroisopropyl methacrylate | | |
| Perfluorcyclohexyl methacrylate | | |
| 1H,1H,heptafluorbutyl acrylate | | |
| 1H,1H, 5H-octafluoropentyl methacrylate | 14.98 | 10.01 |
| 1H,1H,7H-dodecafluroheptyl methacrylate | | |
| 1H,1H,7H-dodecafluroheptyl acrylate | | |
| 1H,1H-perfluorooctyl acrylate | | |
| PDMS-MA (MCR-M17) | 9.98 | 14.5 |
| VAZO-52 | | |
| AIBN | 0.20 | 0.21 |
| 2-mercaptoethanol | 0.27 | 0.26 |
| Stage-1, free radical polymerization | | |
| Stage-2, conversion to photopolymer with IEM | | |
| IEM | 3.50 | 3.5 |
| Total (catalyst and solvent not included) | 100.0 | 100.0 |
| Reaction Parameters | | |
| Total Monomer charge excluding IEM, relevant to split bactch | 483.8 | 483.8 |
| Total Monomer charge including IEM (grams) | N/A | N/A |
| Volume of solvent (mL) | 750.0 | 750.0 |
| Polymerization Temperature, stage 1 (deg-C.) | 40 | 40 |
| Polymerization time, stage 1 (hrs) | 48 | 48 |
| Polymerization Solvent | EtOAc | EtOAc |
| Grams DBTDL (catalyst), stage 2 reaction temp ~40 deg-C. | 0.157 (after spliting batch) | 0.169 (after spliting batch) |
| milligrams of 4-hydroxyTEMPO (Added at stage 2 of reaction) | 55 mg | 55 mg |
| Properties | | |
| Viscosity in centipoise of 50% Solution at 25 deg-C. | 372 | 324 |
| MW | 66897 | 73351 |
| Mn | 28809 | 28660 |
| Mw/Mn (polydispersity) | 2.32 | 2.56 |

TABLE 5

Copolymer Formulations and properties

| | Binder Polymer Example Numbers | |
|---|---|---|
| | 13<br>from Split<br>batch (1600-83) | 14<br>from Split<br>batch (1600-84) |
| | Lot/Ref Numbers | |
| Material | 1600-86-1<br>Wt % | 1600-87-1<br>Wt % |
| DMA | 39.13 | 37.29 |
| TRIS | 20.71 | 19.42 |
| HEMA | 9.98 | 9.58 |
| MMA | 4.59 | 4.39 |
| 2,2,2-trifluoroethyl acrylate (DHPFEA) | 0.00 | |
| 2,2,2-trifluoroethyl methacrylate (DHPFEA) | 0.00 | |
| 1H,1H,7H-dodecafluroheptyl acrylate | 10.03 | |
| Hexafluroisopropyl methacrylate | 0.00 | |
| Perfluorcyclohexyl methacrylate | 0.00 | |

TABLE 5-continued

Copolymer Formulations and properties

| | Binder Polymer Example Numbers | |
|---|---|---|
| | 13 from Split batch (1600-83) | 14 from Split batch (1600-84) |
| | Lot/Ref Numbers | |
| Material | 1600-86-1 Wt % | 1600-87-1 Wt % |
| 1H,1H,heptafluorbutyl acrylate | 0.00 | |
| 1H,1H,5H-octafluoropentyl methacrylate | 0.00 | 14.9 |
| 1H,1H,7H-dodecaflurohepyl methacrylate | 0.00 | |
| 1H,1H,7H-dodecafluroheptyl acrylate | 0.00 | |
| 1H,1H-perfluorooctyl acrylate | 0.00 | |
| PDMS-MA (MCR-M17) | 15.01 | 9.93 |
| VAZO-52 | | |
| AIBN | 0.28 | 0.201 |
| 2-mercaptoethanol | 0.27 | 0.2688 |
| Stage-1, free radical polymerization | | |
| Stage-2, conversion to photopolymer with IEM | | |
| IEM | 4.18 | 4.02 |
| Total (catalyst and solvent not included) | 100.0 | 100.0 |
| Reaction Parameters | | |
| Total Monomer charge excluding IEM, relevant to split bactch | N/A | N/A |
| Total Monomer charge including IEM (grams) | N/A | N/A |
| Volume of solvent (mL) | N/A | N/A |
| Polymerization Temperature, stage 1 (deg-C.) | 40 | 40 |
| Polymerization time, stage 1 (hrs) | 48.00 | 48 |
| Polymerization Solvent | EtOAc | EtOAc |
| Grams DBTDL (catalyst), stage 2 reaction temp ~40 deg-C. | 0.1769 (after spliting batch) | 0.189 (after spliting batch) |
| milligrams of 4-hydroxyTEMPO (Added at stage 2 of reaction) | N/A | N/A |
| Properties | | |
| Viscosity in centipoise of 50% Solution at 25 deg-C. | 2120 | 319 |
| MW | 108046 | 68068 |
| Mn | 33270 | 28400 |
| Mw/Mn (polydispersity) | 3.25 | 2.4 |

TABLE 6

Copolymer Formulations and properties

| | Binder Polymer Example Numbers | | |
|---|---|---|---|
| | 15 from Split batch (1600-85) | 16 | 17 |
| | Lot/Ref Numbers | | |
| Material | 1600-88-1 Wt % | 3260-2 Wt % | 3260-3 Wt % |
| DMA | 37.27 | 38.06 | 37.98 |
| TRIS | 19.87 | 24.11 | 24.08 |
| HEMA | 9.56 | 9.63 | 9.65 |
| MMA | 4.4 | 0.00 | 0.00 |
| 2,2,2-trifluoroethyl acrylate (DHPFEA) | | 0.00 | 0.00 |
| 2,2,2-trifluoroethyl methacrylate (DHPFEA) | | 0.00 | 0.00 |
| 1H,1H,7H-dodecafluroheptyl acrylate | | 0.00 | 0.00 |
| Hexafluroisopropyl methacrylate | | 0.00 | 0.00 |
| Perfluorcyclohexyl methacrylate | | 10.04 | 10.10 |
| 1H,1H,heptafluorbutyl acrylate | | 0.00 | 0.00 |
| 1H,1H,5H-octafluoropentyl methacrylate | 9.95 | 0.00 | 0.00 |
| 1H,1H,7H-dodecaflurohepyl methacrylate | | 0.00 | 0.00 |
| 1H,1H,7H-dodecafluroheptyl acrylate | | 0.00 | 0.00 |
| 1H,1H-perfluorooctyl acrylate | | 0.00 | 0.00 |
| PDMS-MA (MCR-M17) | 14.41 | 14.42 | 14.38 |
| VAZO-52 | | | |

TABLE 6-continued

Copolymer Formulations and properties

| | Binder Polymer Example Numbers | | |
|---|---|---|---|
| | 15 from Split batch (1600-85) | 16 | 17 |
| | Lot/Ref Numbers | | |
| Material | 1600-88-1 Wt % | 3260-2 Wt % | 3260-3 Wt % |
| AIBN | 0.2044 | 0.20 | 0.26 |
| 2-mercaptoethanol | 0.2812 | 0.25 | 0.25 |
| Stage-1, free radical polymerization | | | |
| Stage-2, conversion to photopolymer with IEM | | | |
| IEM | 4.08 | 3.29 | 3.29 |
| Total (catalyst and solvent not included) | 100.0 | 100.0 | 100.0 |
| Reaction Parameters | | | |
| Total Monomer charge excluding IEM, relevant to split bactch | N/A | N/A | N/A |
| Total Monomer charge including IEM (grams) | N/A | 402.0 | 402.0 |
| Volume of solvent (mL) | N/A | 600.0 | 600.0 |
| Polymerization Temperature, stage 1 (deg-C.) | 40.00 | 40.00 | 40.00 |
| Polymerization time, stage 1 (hrs) | 48 | 48.00 | 48.00 |
| Polymerization Solvent | EtOAc | EtOAc | EtOAc |
| Grams DBTDL (catalyst), stage 2 reaction temp ~40 deg-C. | 0.184 (after spliting batch) | 0.237 | 0.249 |
| milligrams of 4-hydroxyTEMPO (Added at stage 2 of reaction) | N/A | 40 mg | 41 mg |
| Properties | | | |
| Viscosity in centipoise of 50% Solution at 25 deg-C. | 327 | 1580 | 1450 |
| MW | 71257 | 92245 | 91559 |
| Mn | 27938 | 28759 | 29630 |
| Mw/Mn (polydispersity) | 2.55 | 3.21 | 3.09 |

TABLE 7

Copolymer Formulations and properties

| | Binder Polymer Example Numbers | | | |
|---|---|---|---|---|
| | 18 | 19 | 20 | 21 |
| | Lot/Ref numbers | | | |
| Material | 3260-4 Wt % | 3260-5 Wt % | 3260-6 Wt % | 3260-9 Wt % |
| DMA | 37.97 | 38.05 | 37.99 | 37.99 |
| TRIS | 24.13 | 24.11 | 24.07 | 24.04 |
| HEMA | 9.60 | 9.63 | 9.66 | 9.61 |
| MMA | 4.39 | 0.00 | 0.00 | 0.00 |
| 2,2,2-trifluoroethyl acrylate (DHPFEA) | 0.00 | 0.00 | 0.00 | 0.00 |
| 2,2,2-trifluoroethyl methacrylate (DHPFEA) | 0.00 | 0.00 | 0.00 | 0.00 |
| 1H,1H,7H-dodecafluroheptyl acrylate | 0.00 | 0.00 | 0.00 | 0.00 |
| Hexafluoroisopropyl methacrylate | 0.00 | 0.00 | 0.00 | 0.00 |
| Perfluorocyclohexyl methacrylate | 0.00 | 10.04 | 10.08 | 10.18 |
| 1H,1H,heptafluorbutyl acrylate | 0.00 | 0.00 | 0.00 | 0.00 |
| 1H,1H,5H-octafluoropentyl methacrylate | 5.55 | 0.00 | 0.00 | 0.00 |
| 1H,1H,7H-dodecafluroheptyl methacrylate | 0.00 | 0.00 | 0.00 | 0.00 |
| 1H,1H,7H-dodecafluroheptyl acrylate | 0.00 | 0.00 | 0.00 | 0.00 |
| 1H,1H-perfluorooctyl acrylate | 0.00 | 0.00 | 0.00 | 0.00 |
| EOEMA | 0.00 | 0.00 | 0.00 | 0.00 |
| PDMS-MA (MCR-M17) | 14.43 | 14.40 | 14.37 | 14.35 |
| VAZO-52 | | | | |
| AIBN | 0.22 | 0.20 | 0.26 | 0.26 |
| 2-mercaptoethanol | 0.27 | 0.26 | 0.26 | 0.26 |
| Stage-1, free radical polymerization | | | | |
| Stage-2, conversion to photopolymer with IEM | | | | |
| IEM | 3.45 | 3.31 | 3.30 | 3.32 |
| Total (catalyst and solvent not included) | 100.0 | 100.0 | 100.0 | 100.0 |

TABLE 7-continued

Copolymer Formulations and properties

| | Binder Polymer Example Numbers | | | |
|---|---|---|---|---|
| | 18 | 19 | 20 | 21 |
| | Lot/Ref numbers | | | |
| Material | 3260-4 Wt % | 3260-5 Wt % | 3260-6 Wt % | 3260-9 Wt % |
| Reaction Parameters | | | | |
| Total Monomer charge excluding IEM (relevant to split batch, 2nd stage) | N/A | N/A | N/A | N/A |
| Total Monomer charge including IEM (grams) | 401.0 | 402.0 | 403.0 | 403.0 |
| Volumes of solvent (mL) | 600 | 600 | 600 | 600 |
| Polymerization Temperature, stage 1 (deg-C.) | 40 | 40 | 40 | 40 |
| Polymerization time, stage 1 (hrs) | 48 | 48 | 72 | 72 |
| Polymerization Solvent | EtOAc | EtOAc | EtOAc | EtOAc |
| Grams DBTDL (catalyst), stage 2 reaction temp ~40 deg-C. | 0.249 | 0.253 | 0.264 | 0.259 |
| milligrams of 4-hydroxyTEMPO (Added at stage 2 of reaction) | 41 mg | 41 mg | 40 mg | 43 mg |
| Properties | | | | |
| Viscosity in centipoise of 50% Solution at 25 deg-C. | 1320 | 1180 | 1250 | 2300 |
| MW | 77311 | 89829 | 89356 | 114079 |
| Mn | 26686 | 27678 | 27623 | 29955 |
| Mw/Mn (polydispersity) | 2.9 | 3.25 | 3.23 | 3.81 |

TABLE 8

Copolymer Formulations and properties

| | Binder Polymer Example Numbers | | | |
|---|---|---|---|---|
| | 22 | 23 | 24 | 25 |
| | Lot/Ref Numbers | | | |
| Material | 3260-7 Wt % | 3260-10 Wt % | 3260-8 Wt % | 3260-11 Wt % |
| DMA | 37.88 | 38.00 | 38.03 | 37.77 |
| TRIS | 24.09 | 24.05 | 24.07 | 23.80 |
| HEMA | 9.67 | 9.65 | 9.63 | 9.98 |
| MMA | 0.00 | 0.00 | 0.00 | 0.00 |
| 2,2,2-trifluoroethyl acrylate (DHPFEA) | 0.00 | 0.00 | 0.00 | 0.00 |
| 2,2,2-trifluoroethyl methacrylate (DHPFEA) | 0.00 | 0.00 | 0.00 | 0.00 |
| 1H,1H,7H-dodecafluroheptyl acrylate | 0.00 | 0.00 | 0.00 | 0.00 |
| Hexafluroisopropyl methacrylate | 0.00 | 0.00 | 0.00 | 0.00 |
| Perfluorcyclohexyl methacrylate | 10.08 | 10.05 | 10.12 | 9.97 |
| 1H,1H,heptafluorbutyl acrylate | 0.00 | 0.00 | 0.00 | 0.00 |
| 1H,1H,5H-octafluoropentyl methacrylate | 0.00 | 0.00 | 0.00 | 0.00 |
| 1H,1H,7H-dodecafluroheptyl methacrylate | 0.00 | 0.00 | 0.00 | 0.00 |
| 1H,1H,7H-dodecafluroheptyl acrylate | 0.00 | 0.00 | 0.00 | 0.00 |
| 1H,1H-perfluorooctyl acrylate | 0.00 | 0.00 | 0.00 | 0.00 |
| PDMS-MA (MCR-M17) | 14.38 | 14.36 | 14.36 | 14.28 |
| VAZO-52 | | | | 0.54 |
| AIBN | 0.32 | 0.32 | 0.20 | |
| 2-mercaptoethanol | 0.26 | 0.25 | 0.26 | 0.25 |
| Stage-1, free radical polymerization | | | | |
| Stage-2, conversion to photopolymer with IEM | | | | |
| IEM | 3.31 | 3.33 | 3.33 | 3.40 |
| Total (catalyst and solvent not included) | 100.0 | 100.0 | 100.0 | 100.0 |
| Reaction Parameters | | | | |
| Total Monomer charge excluding IEM, relevant to split bactch | N/A | N/A | N/A | N/A |
| Total Monomer charge including IEM (grams) | 402.0 | 403.0 | 403.0 | 406.0 |
| Volume of solvent (mL) | 600 | 600 | 600 | 600 |
| Polymerization Temperature, stage 1 (deg-C.) | 40 | 40 | 40 | 40 |
| Polymerization time, stage 1 (hrs) | 72 | 72 | 72 | 44 |
| Polymerization Solvent | EtOAc | EtOAc | EtOAc | EtOAc |
| Grams DBTDL (catalyst), stage 2 reaction temp ~40 deg-C. | 0.274 | 0.266 | 0.262 | 0.279 |
| milligrams of 4-hydroxyTEMPO (Added at stage 2 of reaction) | 41 mg | 43 mg | 44 mg | 40 mg |

TABLE 8-continued

Copolymer Formulations and properties

| | Binder Polymer Example Numbers | | | |
|---|---|---|---|---|
| | 22 | 23 | 24 | 25 |
| | Lot/Ref Numbers | | | |
| Material | 3260-7 Wt % | 3260-10 Wt % | 3260-8 Wt % | 3260-11 Wt % |
| Properties | | | | |
| Viscosity in centipoise of 50% Solution at 25 deg-C. | 1480 | 1140 | 1100 | 665 |
| MW | 105048 | 117509 | 108036 | 96138 |
| Mn | 30619 | 30874 | 31302 | 28726 |
| Mw/Mn (polydispersity) | 3.43 | 3.81 | 3.45 | 3.35 |

TABLE 9

Copolymer Formulations and properties

| | Binder Polymer Example Numbers | | | |
|---|---|---|---|---|
| | 26 | 27 | 28 | 29 |
| | Lot/Ref Numbers | | | |
| Material | 3260-12 Wt % | 3260-15 Wt % | 3260-18 Wt % | 3260-16 Wt % |
| DMA | 37.98 | 37.87 | 37.75 | 37.91 |
| TRIS | 24.02 | 23.97 | 23.97 | 23.98 |
| HEMA | 9.57 | 9.57 | 9.64 | 9.57 |
| MMA | 0.00 | 0.00 | 0.00 | 0.00 |
| 2,2,2-trifluoroethyl acrylate (DHPFEA) | 0.00 | 0.00 | 0.00 | 0.00 |
| 2,2,2-trifluoroethyl methacrylate (DHPFEA) | 0.00 | 0.00 | 0.00 | 0.00 |
| 1H,1H,7H-dodecafluroheptyl acrylate | 0.00 | 0.00 | 0.00 | 0.00 |
| Hexafluroisopropyl methacrylate | 0.00 | 0.00 | 0.00 | 0.00 |
| Perfluorcyclohexyl methacrylate | 10.04 | 10.06 | 9.96 | 10.04 |
| 1H,1H,heptafluorbutyl acrylate | 0.00 | 0.00 | 0.00 | 0.00 |
| 1H,1H, 5H-octafluoropentyl methacrylate | 0.00 | 0.00 | 0.00 | 0.00 |
| 1H,1H,7H-dodecafluroheptyl methacrylate | 0.00 | 0.00 | 0.00 | 0.00 |
| 1H,1H,7H-dodecafluroheptyl acrylate | 0.00 | 0.00 | 0.00 | 0.00 |
| 1H,1H-perfluorooctyl acrylate | 0.00 | 0.00 | 0.00 | 0.00 |
| PDMS-MA (MCR-M17) | 14.35 | 14.31 | 14.34 | 14.33 |
| VAZO-52 | 0.37 | 0.55 | 0.54 | 0.37 |
| AIBN | 0.00 | 0.00 | 0.00 | 0.00 |
| 2-mercaptoethanol | 0.26 | 0.25 | 0.35 | 0.35 |
| Stage-1, free radical polymerization | | | | |
| Stage-2, conversion to photopolymer with IEM | | | | |
| IEM | 3.41 | 3.41 | 3.44 | 3.44 |
| Total (catalyst and solvent not included) | 100.0 | 100.0 | 100.0 | 100.0 |
| Reaction Parameters | | | | |
| Total Monomer charge excluding IEM, relevant to split bactch | N/A | N/A | N/A | N/A |
| Total Monomer charge including IEM (grams) | 405.0 | 405.0 | 404.0 | 404.0 |
| Volume of solvent (mL) | 600 | 600 | 600 | 600 |
| Polymerization Temperature, stage 1 (deg-C.) | 40 | 50 | 50 | 50 |
| Polymerization time, stage 1 (hrs) | 22. | 22 | 44 | 22 |
| Polymerization Solvent | EtOAc | EtOAc | EtOAc | EtOAc |
| Grams DBTDL (catalyst), stage 2 reaction temp ~40 deg-C. | 0.289 | 0.296 | 0.305 | 0.298 |
| milligrams of 4-hydroxyTEMPO (Added at stage 2 of reaction) | 43 mg | 42 mg | 61 mg | 41 mg |
| Properties | | | | |
| Viscosity in centipoise of 50% Solution at 25 deg-C. | 1060 | 568 | 441 | 681 |
| MW | 119065 | 89091 | 63263 | 73524 |
| Mn | 25496 | 27748 | 20753 | 22067 |
| Mw/Mn (polydispersity) | 4.67 | 3.21 | 3.05 | 3.33 |

TABLE 10

Copolymer Formulations and properties

| | Binder Polymer Example Numbers | | | |
|---|---|---|---|---|
| | 30 | 31 | 32 | 33 |
| | Lot/Ref numbers | | | |
| Material | 3260-13 Wt % | 3260-27 Wt % | 3260-19 Wt % | 3260-29 Wt % |
| DMA | 37.97 | 37.97 | 37.98 | 37.74 |
| TRIS | 24.02 | 23.99 | 23.98 | 24.02 |
| HEMA | 9.57 | 9.60 | 9.60 | 9.62 |
| MMA | 0.00 | | 0.00 | 0.00 |
| 2,2,2-trifluoroethyl acrylate (DHPFEA) | 0.00 | | 0.00 | 0.00 |
| 2,2,2-trifluoroethyl methacrylate (DHPFEA) | 0.00 | | 0.00 | 0.00 |
| 1H,1H,7H-dodecafluroheptyl acrylate | 0.00 | | 0.00 | 0.00 |
| Hexafluoroisopropyl methacrylate | 0.00 | | 0.00 | 0.00 |
| Perfluorocyclohexyl methacrylate | 10.04 | 9.94 | 9.99 | 9.92 |
| 1H,1H,heptafluorbutyl acrylate | 0.00 | | 0.00 | 0.00 |
| 1H,1H,5H-octafluoropentyl methacrylate | 0.00 | | 0.00 | 0.00 |
| 1H,1H,7H-dodecafluroheptyl methacrylate | 0.00 | | 0.00 | 0.00 |
| 1H,1H,7H-dodecafluroheptyl acrylate | 0.00 | | 0.00 | 0.00 |
| 1H,1H-perfluorooctyl acrylate | 0.00 | | 0.00 | 0.00 |
| EOEMA | 0.00 | | 0.00 | 0.00 |
| PDMS-MA (MCR-M17) | 14.35 | 14.34 | 14.37 | 14.30 |
| VAZO-52 | 0.37 | 0.37 | 0.37 | 0.55 |
| AIBN | 0.00 | | 0.00 | 0.00 |
| 2-mercaptoethanol | 0.26 | 0.35 | 0.25 | 0.37 |
| Stage-1, free radical polymerization | | | | |
| Stage-2, conversion to photopolymer with IEM | | | | |
| IEM | 3.41 | 3.45 | 3.45 | 3.47 |
| Total (catalyst and solvent not included) | 100.0 | 100.0 | 100.0 | 100.0 |
| Reaction Parameters | | | | |
| Total Monomer charge excluding IEM (relevant to split batch, 2nd stage) | N/A | N/A | N/A | N/A |
| Total Monomer charge including IEM (grams) | 403.0 | 404.0 | 404.0 | 404.0 |
| Volumes of solvent (mL) | 600 | 600 | 600 | 600 |
| Polymerization Temperature, stage 1 (deg-C.) | 40 | 40 | 40 | 50 |
| Polymerization time, stage 1 (hrs) | 22 | 44 | 22 | 22 |
| Polymerization Solvent | EtOAc | EtOAc | EtOAc | BuOAc |
| Grams DBTDL (catalyst), stage 2 reaction temp ~40 deg-C. | 0.280 | 0.303 | 0.303 | 0.302 |
| milligrams of 4-hydroxyTEMPO (Added at stage 2 of reaction) | 42 mg | 38 mg | 38 mg | 60 mg |
| Properties | | | | |
| Viscosity in centipoise of 50% Solution at 25 deg-C. | 1070 | 802.00 | 721 | 336 |
| MW | 97996 | 114201 | 88140 | 65113 |
| Mn | 27851 | 22212 | 27286 | 19994 |
| Mw/Mn (polydispersity) | 3.52 | 5.68 | 3.23 | 3.26 |

TABLE 11

Copolymer Formulations and properties

| | Binder Polymer Example Numbers | | |
|---|---|---|---|
| | 34 | 35 | 36 |
| | Lot/Ref Numbers | | |
| Material | 3226-74 Wt % | 3226-82 Wt % | 3260-17 Wt % |
| DMA | 38.00 | 37.93 | 37.84 |
| TRIS | 33.75 | 24.00 | 23.93 |
| HEMA | 10.05 | 9.91 | 9.55 |
| MMA | 0.00 | 0.00 | 0.00 |
| 2,2,2-trifluoroethyl acrylate (DHPFEA) | 0.00 | 0.00 | 0.00 |
| 2,2,2-trifluoroethyl methacrylate (DHPFEA) | 0.00 | 0.00 | 0.00 |
| 1H,1H,7H-dodecafluroheptyl acrylate | 0.00 | 0.00 | 0.00 |
| Hexafluorcyclohexyl methacrylate | 0.00 | 0.00 | 0.00 |
| Perfluorcyclohexyl methacrylate | 0.00 | 10.03 | 10.04 |
| 1H,1H,heptafluorbutyl acrylate | 0.00 | 0.00 | 0.00 |
| 1H,1H,5H-octafluoropentyl methacrylate | 0.00 | 0.00 | 0.00 |
| 1H,1H,7H-dodecafluroheptyl methacrylate | 0.00 | 0.00 | 0.00 |

TABLE 11-continued

Copolymer Formulations and properties

| | Binder Polymer Example Numbers | | |
|---|---|---|---|
| | 34 | 35 | 36 |
| | Lot/Ref Numbers | | |
| Material | 3226-74 Wt % | 3226-82 Wt % | 3260-17 Wt % |
| 1H,1H,7H-dodecafluroheptyl acrylate | 0.00 | 0.00 | 0.00 |
| 1H,1H-perfluorooctyl acrylate | 0.00 | 0.00 | 0.00 |
| PDMS-MA (MCR-M17) | 14.76 | 14.35 | 14.29 |
| VAZO-52 | 0.00 | 0.54 | 0.55 |
| AIBN | 0.20 | 0.00 | 0.00 |
| 2-mercaptoethanol | 0.32 | 0.35 | 0.37 |
| Stage-1, free radical polymerization | | | |
| Stage-2, conversion to photopolymer with IEM | | | |
| IEM | 2.92 | 2.90 | 3.42 |
| Total (catalyst and solvent not included) | 100.0 | 100.0 | 100.0 |
| Reaction Parameters | | | |
| Total Monomer charge excluding IEM, relevant to split bactch | N/A | N/A | N/A |
| Total Monomer charge including IEM (grams) | 400 | 404 | 405.0 |
| Volumes of solvent (mL) | 600 | 600 | 600 |
| Polymerization Temperature, stage 1 (deg-C.) | 40 | 40 | 50 |
| Polymerization time, stage 1 (hrs) | 48 | 22 | 22 |
| Polymerization Solvent | EtOAc | EtOAc | BuOAc |
| Grams DBTDL (catalyst), stage 2 reaction temp ~40 deg-C. | 0.168 | 0.168 | 0.299 |
| milligrams of 4-hydroxyTEMPO (Added at stage 2 of reaction) | 37 | 45 | 45 |
| Properties | | | |
| Viscosity of 50% Solution at 25 deg-C. | 1050 | 1350 | 332 |
| MW | | 166594 | 70362 |
| Mn | | 26600 | 21237 |
| Mw/Mn (polydispersity) | | 6.26 | 3.31 |

TABLE 12

Copolymer formulations and properties

| | Binder Polymer Example Numbers | | | | | |
|---|---|---|---|---|---|---|
| | 37 | 38 | 39 | 40 | 41 | 42 |
| | Lot/Ref Number | | | | | |
| | 3260-52-2 Wt % | 3260-53-2 Wt % | 3260-15 Wt % | 3364-61 Wt % | 3364-62 Wt % | 3364-63 Wt % |
| Material | | | | | | |
| DMA | 35.248 | 37.860 | 37.87 | 37.87 | 37.776 | 37.872 |
| TRIS | 22.299 | 34.038 | 23.97 | 23.97 | 23.910 | 34.036 |
| HEMA | 8.925 | 9.581 | 9.57 | 9.57 | 9.544 | 9.568 |
| Perflurocyclohexyl methacrylate | 0.000 | 0.000 | 10.06 | 0.00 | 0.000 | 0.000 |
| Cyclohexyl methacrylate | 16.271 | 0.000 | | 0.00 | 0.000 | 0.000 |
| 1H,1H,5H-octafluorpentyl methacrylate | 0.000 | 0.000 | | 10.07 | 0.000 | 0.000 |
| n-pentyl methacrylate | 0.000 | 0.000 | | 0.00 | 10.039 | 0.000 |
| PDMS-MA (MCR-M17) | 13.324 | 14.293 | 14.31 | 14.31 | 14.278 | 14.314 |
| VAZO-52 | 0.509 | 0.549 | 0.55 | 0.55 | 0.544 | 0.546 |
| 2-mercaptoethanol | 0.236 | 0.258 | 0.25 | 0.25 | 0.252 | 0.253 |
| IEM | 3.19 | 3.42 | 3.41 | 3.41 | 3.402 | 3.411 |
| Total (catalyst and solvent not included) | 100 | 100 | 100 | 100 | 100 | 100 |
| Reaction Parameters | | | | | | |
| Total Monomer charge including IEM (grams) | 435 | 405 | 405 | 405 | 405 | 405 |
| Volume of solvent (mL) | 600 | 600 | 600 | 600 | 600 | 600 |
| Polymerization Temperature, stage 1 (deg-C.) | 50 | 50 | 50 | 50 | 50 | 50 |
| Polymerization time, stage 1 (hrs) | 22 | 22 | 22 | 22 | 22 | 22 |
| Polymerization Solvent | EtOAc | EtOAc | EtOAc | EtOAc | EtOAc | EtOAc |
| Grams DBTDL (catalyst), stage 2 reaction temp ~40 deg-C. | 0.2985 | 0.2987 | 0.296 | 0.17 | 0.17 | 0.17 |

TABLE 12-continued

Copolymer formulations and properties

| | Binder Polymer Example Numbers | | | | | |
|---|---|---|---|---|---|---|
| | 37 | 38 | 39 | 40 | 41 | 42 |
| | | | Lot/Ref Number | | | |
| | 3260-52-2 Wt % | 3260-53-2 Wt % | 3260-15 Wt % | 3364-61 Wt % | 3364-62 Wt % | 3364-63 Wt % |
| milligrams of 4-hydroxyTEMPO (Added at stage 2 of reaction) Properties | 42 mg | 41 mg | 42 mg | 37 mg | 38 mg | 37 mg |
| Viscosity in centipoise of 50% Solution at 25 deg-C. | 1460 | 798 | 1640 | 1160 | 832 | 574 |
| MW | 55729 | 54137 | 89091 | 39730 | 64045 | 54804 |
| Mn | 13980 | 11548 | 27748 | 9740 | 16489 | 14145 |
| Mw/Mn (polydispersity) | 3.99 | 4.69 | 3.21 | 4.08 | 3.89 | 3.87 |

Foot notes for tables 1-12
1) EtOAc = ethyl acetate, BuOAc = butyl acetate, IEM = 2-isocyanatoethylmethacrylate
2) Polymerization of monomer in stage 1 of the operation typically used a total monomer charge of about 400 grams dissolved in about 600 mL of solvent
3) Stage 2 of the operation (conversion of copolymer to photo-polymer): Prior to IEM reaction, copolymer solution is inhibited with 4-hydroxyTEMPO
4) Dibutyltin dilaurate is used as a catalyst in the IEM functionalization reaction. This reaction is done at about 40 deg-C. S
5) Ethyl acetate or butyl acetate are exchanged with ethanol after the IEM reaction
6) Molecular weight was determined by gel permeation chromatography (GPC), Mw = weight average molecular weight, Mn = number average molecular weight.

Additional Examples of Inks and Colored Contact Lenses
  a) Several inks are formulated from binder polymers as shown in tables 13-15. Polypropylene lens molds are printed and inks are UV-cured as shown in tables 13-15. Lens molds are filled with Lotrafilcon-B and then cured to yield colored silicone hydrogel lenses. Three inks are made from each binder polymer (Green, Hazel, and Black) as shown in tables 13-15. Ink formulations containing Daracue 4265, Irgacure 907, and Irgacure 369 are cured using UVC (~254 nm), broad band UVB light and Light Stream technology (Hammatsu type lamp at ~297 nm) as shown in tables 13-15. The ink pastes used in formulating inks are prepared as described below. Compositions of binder polymer formulations are given in tables 1-12.
  b) Preparation of Ink Pastes used in Ink formulations
    i) Green Ink Paste is prepared by combining about 129.5 grams of chromium oxide with 0.55 grams of PCN-Blue, 130 grams of ethanol and about 449 grams of grinding media in a ceramic roller jar. The pigment mixture is milled on roller mill for about 24 hours. The percent solids in the paste is then determined gravimetrically.
    ii) Hazel Ink Paste is prepared by combining about 0.72 grams of PCN-blue, 8.55 grams of titanium oxide, 21.48 grams of iron oxide red, 60.24 grams of iron oxide yellow, 169 grams of ethanol and 451 grams of grinding media in a ceramic roller jar. The pigment mixture is milled for about 24 hours. The percent solids in the paste is then determined gravimetrically.
    iii) Black Ink Paste is prepared by combining 130 grams of iron oxide black, 130 grams of ethanol and 452 grams of grinding media in a ceramic roller jar. The sample is milled for about 24 hours on a roller mill. The percent solids in the paste is then determined gravimetrically.
    iv) Inks formulated from binder polymers 1600-80-2, 1600-68-2, 1600-72-2, 1600-79-2, 1600-83-2, 1600-84-2, 1600-85-2
      (1) Ink experiment 1 of table 13 shows that inks (black, green and hazel) prepared from binder polymer #3 from table 1 (1600-80-2) can be formulated with 3.25-3.44% Darcure 4265 and cured under UVC to produce silicone colored hydrogel lenses with good image quality (non-smeared)
      (2) Ink Experiment 2 of table 13 shows that inks (black, green and hazel) prepared from binder polymer #3 from table 1 (1600-80-2) can be formulated with about 2% Darcure 4265 and cured under UVB (~297 nm) for about 45 seconds to produce colored silicone hydrogel lenses with good image quality (non-smeared). One of the three inks (green) showed slight smudging under these conditions while two others did not smear nor smudge.
      (3) Ink Experiment 3a-3c of table 13 shows that inks (black, green and hazel) prepared from binder polymer #3 from table 1 (1600-80-2) are formulated with about 2% Darcure 4265 and cured under UVB (~297 nm) for 60, 90, and 120 seconds. Colored silicone hydrogel lenses with non-smeared print patterns are produced from these samples.
      (4) Ink Experiments 4a-4d of table 13 show that inks (black, green and hazel) prepared from binder polymer #3 from table 1 (1600-80-2)), formulated with about 2% Irgacure 907 and cured under UVB (~297 nm). Ink samples that are cured for 10-45 seconds (10, 15, 30 and 45 seconds) resulted in colored silicone hydrogel lenses with non-smeared print patterns.
      (5) Ink Experiments 5a-5c of table 13 show that inks (black, green and hazel) prepared from binder polymer #3 from table 1 (1600-80-2)), formulated with about 1% Irgacure 907 and cured under UVB (~297 nm). Ink samples that are cured for 15, 20 and 30 seconds resulted in colored silicone hydrogel lenses with non-smeared print patterns for black and hazel inks. The green inks showed some smudging.
      (6) Ink Experiments 6a-6b of table 14 show that inks (black, green and hazel) prepared from binder polymer #3 from table 1 (1600-80-2), formulated with about 1% Irgacure 369 and cured under UVB (~297 nm). Ink samples that are cured for 20 and 30 seconds resulted in colored silicone hydrogel lenses with non-smeared print patterns for all three colors (black, green and hazel).

(7) Ink Experiments 7 of table 14 show that inks (black, green and hazel) prepared from binder polymer #5 from table 2 (1600-68-2), formulated with about 1% Irgacure 907 and cured under UVB (40 watt broadband). Ink samples that are cured for 50 minutes resulted in colored silicone hydrogel lenses with smeared print patterns. The smearing that occurred in this sample is believed to be the result of low monomer conversion in the binder polymer solution (1600-68-2). A 50% copolymer solution 1600-68-2 had a Brookfield viscosity of about 68 cps as compared to about 242 cps for a 50% copolymer solution of 1600-80-2.

(8) Ink Experiments 8 of table 14 show that inks (black, green and hazel) prepared from binder polymer #6 from table 2 (1600-72-2), formulated with about 1% Irgacure 907 and cured under UVB (40 watt broadband). Ink samples that are cured for 50 minutes resulted in colored silicone hydrogel lenses with non-smeared print patterns.

(9) Ink Experiments 9 of table 14 show that inks (black, green and hazel) prepared from binder polymer #8 from table 2 (1600-79-2), formulated with about 1% Irgacure 369 and cured under UVB (40 watt broadband). Ink samples that are cured for 50 minutes resulted in colored silicone hydrogel lenses with non-smeared print patterns.

(10) Ink Experiments 10a-10c of table 14 show that inks (black, green and hazel) prepared from binder polymer #8 from table 3 (1600-83-2), formulated with about 1% Irgacure 369. Ink samples that are cured for 90 minutes under broadband UVB resulted in colored silicone hydrogel lenses with non-smeared print patterns for black and hazel inks. The green ink in experiment 10 smudged. All three inks are also cured at about 297 nm for 30 and 60 seconds as shown in experiments 10b-10c. The black and hazel inks did not show smearing in silicone hydrogel lenses. The green inks showed some smudging.

(11) Ink Experiments 11a-11f of table 14 show that inks (black, green and hazel) prepared from binder polymer #11 from table 4 (1600-84-2), formulated with about 1% Irgacure 369 and cured under broadband UVB and UVB (~297). Ink samples from experiment 11a are cured for 90 minutes under broadband UVB. Colored silicone hydrogel lenses with non-smeared print patterns are obtained using inks from experiment 1a. Inks from experiments 11b-11d are cured between about 30-60 seconds under UVB (~297 nm). Colored silicone hydrogel lenses with non-smeared ink patterns are obtained. Some cracks are observed near the print zone in these samples. Aging colored silicone hydrogel lenses in molds for about one day prior to lens extraction eliminated cracks near the print zones as shown in experiments 11e and 11f. Ink Experiments 1e-11f of table 14 show that inks (black, green and hazel) prepared from binder polymer 1600-84-2, formulated with about 1% Irgacure 369. Ink samples are cured for 30 seconds under UVB (~297 nm) resulted in colored silicone hydrogel lenses with non-smeared print patterns for black and hazel inks. The lens samples are aged for about one day prior to lens extraction and no cracks are noted near the print areas in the colored silicone hydrogel lenses.

(12) Ink Experiments 12a-12d of table 15 show that inks (black, green and hazel) prepared from binder polymer #11 (1600-84-2), formulated with about 1% Irgacure 907. Ink samples that are cured for 60 minutes under broadband UVB resulted in colored silicone hydrogel lenses showing some smudging, smearing and fading as noted in table 15. Aging cured lenses for about one day prior to lens extraction reduced the presence of cracks near the print zones. All three inks are also cured at about 297 nm for 30 seconds as shown in experiment 12c-d. (Need to check this) Cured lenses aged for about one day prior to lens extraction did not show cracks in print zone. Colored silicone hydrogel lenses are obtained. Cracks are not observed near the print zones. The hazel ink did not show smearing. The black and green inks showed smearing and smudging.

v) Ink formulated from copolymer #5 from table 2 (1600-68-2): This copolymer contained about 7.8% 1H,1H,5H-octafluoropentyl methacrylate. This copolymer had a MW of 58K but its viscosity at 50% concentration in ethanol solution is rather low viscosity (68 cps). This viscosity value suggests that the degree of conversion is low. Ink prepared from this solution did not perform well. Inks cured under UV-B for about 50 minutes showed smearing in final lenses. This result suggests that if the polymer solution in the ink contains too much monomer, inks might not perform well. There might be a need for more extensive curing prior to lens casting.

vi) Ink formulated from copolymer #6 (1600-72-2): This copolymer contained about 38% DMA, 24% TRIS, 10% HEMA, 4.37% MMA, and 5.5% dihydroperfluoroethyl lacrylate. The MW of this copolymer is about 161 K and the viscosity of a 50% solution is relatively high (~6300 cps). This suggests a relatively high conversion of monomer during polymerization. Inks formulated from this copolymer are cured under the same conditions as ink form 1600-68-2 (see i, above). Inks prepared from this sample did not show smearing after exposure to lens formulation, lens curing and lens extraction in isopropanol.

vii) Ink formulated from copolymer #8 from table 2 (1600-79-2): This copolymer contained about 38% DMA, 24% TRIS, 10% HEMA, 4.37% MMA, and 5.5% 1H,1H-heptafluorobutyl acrylate. The MW of this copolymer is about 135 K and the viscosity of a 50% solution is relatively high (~2470 cps). Inks formulated from this copolymer are cured under the same conditions as inks form (i, ii above) except that Iragacure 369 is used in the formulation rather than Irgacure 907. Inks prepared form this copolymer 1600-79-2 did not show smearing after exposure to lens formulation, lens curing and lens extraction in isopropanol.

Preparation and Testing of Silicone Hydrogel Samples in Tables 16-17

Ethanol solutions containing about 50% copolymer and 0.25% Daracure 1173 are prepared. Polypropylene molds are filled with about 100 microliters of lens formulation. Lenses are produced by curing under UVA at about of 3.51 Mw/cm$^2$ for about 10 minutes. Lenses are extracted in isopropanol for about one hour and then equilibrated in purified water for 30 minutes. After 30 minutes, lenses are placed in fresh purified water for an additional 30 minutes and then transferred to saline solution. Samples are characterized for Dk, mechanical properties, and swelling properties in water and ethanol as shown in tables 16-17. Disks are also prepared by curing copolymer solutions in polypropylene molds.

Preparation of Disks:

Ethanol solutions containing 50% copolymer and 0.25% Daracure 1173 are prepared. About 200 microliters of copolymer solution is added to polypropylene molds and samples are irradiated with UVA light for about 10 minutes at about 3.5 mW/cm$^2$ intensity. The disks are extracted for about 1 hour in isopropanol and equilibrated in ultra pure water twice for 30 minutes.

Polorographic method is used for Dk measurement of lenses. Mechanical properties of hydrogels are measured on strips cut from lenses. Samples are submerged in a test cell containing saline and tensile tested at a speed of 200 um/s. The disks are used for contact angle and surface energy measurements. The contact angle in tables 16-17 are those of water on water hydrated silicone hydrogel disks. Surface energy of dried polymer disks 3260-15-2, 3260-27-2, 3260-52-2, 3260-53-2, 3364-61, 3364-62 is found to be about 29 dynes/cm$^2$ as determined with Dyne pens from Tigres Corporation. Surface energy is measured on dried disks.

Table 16 shows that decreasing TRIS from 34% to 23% by adding 1H,1H,5H-octafluorpentyl methacrylate to a copolymer formulation results in significantly less swelling of lenses in ethanol. Therefore, use of certain fluoro-containing monomers in copolymer formulations is claimed as a means for controlling print resolution/expansion in inks prepared by such materials. Lenses prepared from copolymers containing fluoro-monomers showed greater toughness and maximum stress values during tensile testing as compared to lenses prepared from non-fluoro-containing copolymers as shown in table 16. Table 16 also shows decreasing TRIS by replacing some portion of it with hydrophobic monomers such as cyclohexyl methacrylate or pentyl methacrylate increases tensile strength and toughness. Results in tables 16 and 17 show that Dk decreases less when TRIS is replaced by perfluorocyclohexyl methacrylate as compared to other methacrylates such as n-pentyl methacrylate or 1H,1H,5H-octafluoropentyl methacrylate. Therefore, use of fluoro-containing monomers such as perfluorocyclohexylmethacrylate is claimed as a means of increasing toughness with less impact on Dk as compared to hydrocarbon monomers. Monomers containing long fluorinated chains as compared to monomers with shorter fluorinated chains might be more effective in increasing Dk. Steric bulk of the fluorinated monomer is also expected to influence Dk. Dk might be enhanced by fluorinated monomers that contain branching, or cylic structure.

TABLE 13

| | | | | | | | | | |
|---|---|---|---|---|---|---|---|---|---|
| a. Ink formulations used in the preparation of colored silicone hydrogel lenses | | | | | | | | | |
| Experiment # | Ink Formulation | Binder Polymer Example # | Ink Color | Photoinitiator | % Binder Polymer | % Pigment | % Photoinitiator | % Ethanol | Total % |
| 1 | 1600-89-1 | 3 | Black | Daracure 4265 | 48.71 | 10.02 | 3.25 | 38.00 | 100 |
| | 1600-89-2 | 3 | Hazel | Daracure 4265 | 49.17 | 4.83 | 3.44 | 42.56 | 100 |
| | 1600-89-3 | 3 | Green | Daracure 4265 | 49.20 | 6.75 | 3.40 | 40.64 | 100 |
| 2 | 1600-90-1 | 3 | Black | Daracure 4265 | 44.91 | 10.23 | 2.02 | 42.84 | 100 |
| | 1600-90-2 | 3 | Hazel | Daracure 4265 | 45.07 | 4.89 | 2.05 | 48.00 | 100 |
| | 1600-90-3 | 3 | Green | Daracure 4265 | 44.92 | 6.84 | 2.03 | 46.22 | 100 |
| 3a | 1600-90-1 | 3 | Black | Daracure 4265 | 44.91 | 10.23 | 2.02 | 42.84 | 100 |
| | 1600-90-2 | 3 | Hazel | Daracure 4265 | 45.07 | 4.89 | 2.05 | 48.00 | 100 |
| | 1600-90-3 | 3 | Green | Daracure 4265 | 44.92 | 6.84 | 2.03 | 46.22 | 100 |
| 3b | 1600-90-1 | 3 | Black | Daracure 4265 | 44.91 | 10.23 | 2.02 | 42.84 | 100 |
| | 1600-90-2 | 3 | Hazel | Daracure 4265 | 45.07 | 4.89 | 2.05 | 48.00 | 100 |
| | 1600-90-3 | 3 | Green | Daracure 4265 | 44.92 | 6.84 | 2.03 | 46.22 | 100 |
| 3c | 1600-90-1 | 3 | Black | Daracure 4265 | 44.91 | 10.23 | 2.02 | 42.84 | 100 |
| | 1600-90-2 | 3 | Hazel | Daracure 4265 | 45.07 | 4.89 | 2.05 | 48.00 | 100 |
| | 1600-90-3 | 3 | Green | Daracure 4265 | 44.92 | 6.84 | 2.03 | 46.22 | 100 |
| 4a | 1600-94-1 | 3 | Black | Irgacure 907 | 44.75 | 9.48 | 2.05 | 43.72 | 100 |
| | 1600-94-2 | 3 | Green | Irgacure 907 | 44.20 | 7.73 | 1.97 | 46.13 | 100 |
| | 1600-94-3 | 3 | Hazel | Irgacure 907 | 44.59 | 5.74 | 1.98 | 47.69 | 100 |
| 4b | 1600-94-1 | 3 | Black | Irgacure 907 | 44.75 | 9.48 | 2.05 | 43.72 | 100 |
| | 1600-94-2 | 3 | Green | Irgacure 907 | 44.20 | 7.73 | 1.97 | 46.13 | 100 |
| | 1600-94-3 | 3 | Hazel | Irgacure 907 | 44.59 | 5.74 | 1.98 | 47.69 | 100 |
| 4c | 1600-94-1 | 3 | Black | Irgacure 907 | 44.75 | 9.48 | 2.05 | 43.72 | 100 |
| | 1600-94-2 | 3 | Green | Irgacure 907 | 44.20 | 7.73 | 1.97 | 46.13 | 100 |
| | 1600-94-3 | 3 | Hazel | Irgacure 907 | 44.59 | 5.74 | 1.98 | 47.69 | 100 |
| 4d | 1600-94-1 | 3 | Black | Irgacure 907 | 44.75 | 9.48 | 2.05 | 43.72 | 100 |
| | 1600-94-2 | 3 | Green | Irgacure 907 | 44.20 | 7.73 | 1.97 | 46.13 | 100 |
| | 1600-94-3 | 3 | Hazel | Irgacure 907 | 44.59 | 5.74 | 1.98 | 47.69 | 100 |
| 5a | 1600-95-1 | 3 | Black | Irgacure 907 | 44.88 | 9.49 | 1.01 | 44.62 | 100 |
| | 1600-95-2 | 3 | Green | Irgacure 907 | 44.80 | 7.35 | 0.99 | 46.86 | 100 |
| | 1600-95-3 | 3 | Hazel | Irgacure 907 | 44.81 | 5.75 | 1.00 | 48.44 | 100 |
| 5b | 1600-95-1 | 3 | Black | Irgacure 907 | 44.88 | 9.49 | 1.01 | 44.62 | 100 |
| | 1600-95-2 | 3 | Green | Irgacure 907 | 44.80 | 7.35 | 0.99 | 46.86 | 100 |
| | 1600-95-3 | 3 | Hazel | Irgacure 907 | 44.81 | 5.75 | 1.00 | 48.44 | 100 |
| 5c | 1600-95-1 | 3 | Black | Irgacure 907 | 44.88 | 9.49 | 1.01 | 44.62 | 100 |
| | 1600-95-2 | 3 | Green | Irgacure 907 | 44.80 | 7.35 | 0.99 | 46.86 | 100 |
| | 1600-95-3 | 3 | Hazel | Irgacure 907 | 44.81 | 5.75 | 1.00 | 48.44 | 100 |

TABLE 13-continued b. Ink curing conditions used in the preparation of colored silicone hydrogel lenses

| Ink Formulation | Ink Cure Source | Intensity | Cure Time | Print Image after lens extraction | Aging before lens extraction | Comment |
|---|---|---|---|---|---|---|
| 1600-89-1 | short wave ~254 nm | N/A | 45 min | No smearing | no | some cracks |
| 1600-89-2 | short wave ~254 nm | N/A | 45 min | No smearing | | |
| 1600-89-3 | short wave ~254 nm | N/A | 45 min | No smearing | | |
| 1600-90-1 | Hammamatsu ~297 nm | 40% Intensity | 45 sec | No smearing | no | |
| 1600-90-2 | Hammamatsu ~297 nm | 40% Intensity | 45 sec | No smearing | | |
| 1600-90-3 | Hammamatsu ~297 nm | 40% Intensity | 45 sec | slight smuding | | Smearing on one side |
| 1600-90-1 | Hammamatsu ~297 nm | 40% Intensity | 60 sec | No smearing | no | cracks near print zone |
| 1600-90-2 | Hammamatsu ~297 nm | 40% Intensity | 60 sec | No smearing | | |
| 1600-90-3 | Hammamatsu ~297 nm | 40% Intensity | 60 sec | No smearing | | |
| 1600-90-1 | Hammamatsu ~297 nm | 40% Intensity | 90 sec | No smearing | no | cracks near print zone |
| 1600-90-2 | Hammamatsu ~297 nm | 40% Intensity | 90 sec | No smearing | | |
| 1600-90-3 | Hammamatsu ~297 nm | 40% Intensity | 90 sec | No smearing | | |
| 1600-90-1 | Hammamatsu ~297 nm | 40% Intensity | 120 sec | No smearing | no | cracks near print zone |
| 1600-90-2 | Hammamatsu ~297 nm | 40% Intensity | 120 sec | No smearing | | |
| 1600-90-3 | Hammamatsu ~297 nm | 40% Intensity | 120 sec | No smearing | | |
| 1600-94-1 | Hammamatsu ~297 nm | 40% Intensity | 10 sec | No smearing[1] | no | cracks near print zone |
| 1600-94-2 | Hammamatsu ~297 nm | 40% Intensity | 10 sec | No smearing | | |
| 1600-94-3 | Hammamatsu ~297 nm | 40% Intensity | 10 sec | No smearing | | |
| 1600-94-1 | Hammamatsu ~297 nm | 40% Intensity | 15 sec | No smearing[1] | no | cracks near print zone |
| 1600-94-2 | Hammamatsu ~297 nm | 40% Intensity | 15 sec | No smearing | | |
| 1600-94-3 | Hammamatsu ~297 nm | 40% Intensity | 15 sec | No smearing | | |
| 1600-94-1 | Hammamatsu ~297 nm | 40% Intensity | 30 sec | No smearing[1] | no | cracks near print zone |
| 1600-94-2 | Hammamatsu ~297 nm | 40% Intensity | 30 sec | No smearing | | |
| 1600-94-3 | Hammamatsu ~297 nm | 40% Intensity | 30 sec | No smearing | | |
| 1600-94-1 | Hammamatsu ~297 nm | 40% Intensity | 45 sec | No smearing[1] | no | cracks near print zone |
| 1600-94-2 | Hammamatsu ~297 nm | 40% Intensity | 45 sec | No smearing | | |
| 1600-94-3 | Hammamatsu ~297 nm | 40% Intensity | 45 sec | No smearing | | |
| 1600-95-1 | Hammamatsu ~297 nm | 40% Intensity | 15 sec | No smearing[1] | no | |
| 1600-95-2 | Hammamatsu ~297 nm | 40% Intensity | 15 sec | smudge | | |
| 1600-95-3 | Hammamatsu ~297 nm | 40% Intensity | 15 sec | No smearing | | |
| 1600-95-1 | Hammamatsu ~297 nm | 40% Intensity | 20 sec | No smearing[1] | No | |
| 1600-95-2 | Hammamatsu ~297 nm | 40% Intensity | 20 sec | smudge | | |
| 1600-95-3 | Hammamatsu ~297 nm | 40% Intensity | 20 sec | No smearing | | |
| 1600-95-1 | Hammamatsu ~297 nm | 40% Intensity | 30 sec | No smearing[1] | No | |
| 1600-95-2 | Hammamatsu ~297 nm | 40% Intensity | 30 sec | smudge | | |
| 1600-95-3 | Hammamatsu ~297 nm | 40% Intensity | 30 sec | No smearing | | |

TABLE 14 a. Ink formulations used in the preparation of colored silicone hydrogel lenses

| Experiment # | Ink Formulation | Binder Polymer Example # | Ink Color | Photoinitiator | % Binder Polymer | % Pigment | % Photoinitiator | % Ethanol | Total % |
|---|---|---|---|---|---|---|---|---|---|
| 6a | 1600-95-1B | 3 | Black | Irgacure 369 | 44.86 | 9.48 | 1.02 | 44.65 | 100 |
|  | 1600-95-2B | 3 | Green | Irgacure 369 | 44.45 | 7.6 | 1.01 | 46.94 | 100 |
|  | 1600-95-3B | 3 | Hazel | Irgacure 369 | 44.94 | 5.69 | 1.00 | 48.36 | 100 |
| 6b | 1600-95-1B | 3 | Black | Irgacure 369 | 44.86 | 9.48 | 1.02 | 44.65 | 100 |
|  | 1600-95-2B | 3 | Green | Irgacure 369 | 44.45 | 7.6 | 1.01 | 46.94 | 100 |
|  | 1600-95-3B | 3 | Hazel | Irgacure 369 | 44.94 | 5.69 | 1.00 | 48.36 | 100 |
| 7 | 1600-96-1A | 5 | Black | Irgacure 907 | 49.72 | 9.62 | 1.03 | 39.63 | 100 |
|  | 1600-96-1B | 5 | Green | Irgacure 907 | 49.87 | 7.55 | 1.04 | 41.52 | 100 |
|  | 1600-96-1C | 5 | Hazel | Irgacure 907 | 49.8 | 5.74 | 1.01 | 43.43 | 100 |
| 8 | 1600-96-2A | 6 | Black | Irgacure 907 | 39.56 | 9.61 | 1.01 | 49.82 | 100 |
|  | 1600-96-2B | 6 | Green | Irgacure 907 | 39.53 | 7.69 | 1.03 | 51.75 | 100 |
|  | 1600-96-2C | 6 | Hazel | Irgacure 907 | 39.65 | 5.80 | 1.03 | 53.52 | 100 |
| 9 | 1600-96-3A | 8 | Black | Irgacure 369 | 40.026 | 9.400 | 1.020 | 49.550 | 100 |
|  | 1600-96-3B | 8 | Green | Irgacure 369 | 39.77 | 7.69 | 1.03 | 51.51 | 100 |
|  | 1600-96-3C | 8 | Hazel | Irgacure 369 | 39.96 | 5.76 | 1.02 | 53.27 | 100 |
| 10a | 3260-1A | 10 | Black | Irgacure 369 | 40.00 | 9.56 | 1.00 | 49.43 | 100 |
|  | 3260-1B | 10 | Green | Irgacure 369 | 39.75 | 7.72 | 1.03 | 51.5 | 100 |
|  | 3260-1C | 10 | Hazel | Irgacure 369 | 39.88 | 6.97 | 1.02 | 52.14 | 100 |
| 10b | 3260-1A | 10 | Black | Irgacure 369 | 40.00 | 9.56 | 1.00 | 49.43 | 100 |
|  | 3260-1B | 10 | Green | Irgacure 369 | 39.75 | 7.72 | 1.03 | 51.5 | 100 |
|  | 3260-1C | 10 | Hazel | Irgacure 369 | 39.88 | 6.97 | 1.02 | 52.14 | 100 |
| 10c | 3260-1A | 10 | Black | Irgacure 369 | 40.00 | 9.56 | 1.00 | 49.43 | 100 |
|  | 3260-1B | 10 | Green | Irgacure 369 | 39.75 | 7.72 | 1.03 | 51.5 | 100 |
|  | 3260-1C | 10 | Hazel | Irgacure 369 | 39.88 | 6.97 | 1.02 | 52.14 | 100 |
| 11a | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 |
| 11b | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 |
| 11c | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 |
| 11d | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 |
| 11e | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 |
| 11f | 3260-2A | 11 | Black | Irgacure 369 | 39.95 | 10.75 | 1.01 | 48.29 | 100 |
|  | 3260-2B | 11 | Green | Irgacure 369 | 39.47 | 7.82 | 0.99 | 51.72 | 100 |
|  | 3260-2C | 11 | Hazel | Irgacure 369 | 39.64 | 5.96 | 1.02 | 53.38 | 100 | b. Ink curing conditions used in the preparation of colored silicone hydrogel lenses

| Ink Formulation | Ink Cure Source | Intensity | Cure Time | Print Image after lens extraction | Aging before lens extraction | Comment |
|---|---|---|---|---|---|---|
| 1600-95-1B | Hammamatsu ~297 nm | 40% Intensity | 20 sec | No smearing[1] | No | cracks near print zone |
| 1600-95-2B | Hammamatsu ~297 nm | 40% Intensity | 20 sec | No smearing |  |  |
| 1600-95-3B | Hammamatsu ~297 nm | 40% Intensity | 20 sec | No smearing |  |  |
| 1600-95-1B | Hammamatsu ~297 nm | 40% Intensity | 30 sec | No smearing[1] | No | cracks near print zone |
| 1600-95-2B | Hammamatsu ~297 nm | 40% Intensity | 30 sec | No smearing |  |  |
| 1600-95-3B | Hammamatsu ~297 nm | 40% Intensity | 30 sec | No smearing |  |  |
| 1600-96-1A | UVB, 40 watt broadband | 2.56 mW/cm2 | 50 min | Smearing | No | cracks near optical zone |
| 1600-96-1B | UVB, 40 watt broadband | 2.56 mW/cm2 | 50 min | Smearing |  |  |
| 1600-96-1C | UVB, 40 watt broadband | 2.56 mW/cm2 | 50 min | Smearing |  |  |
| 1600-96-2A | UVB, 40 watt broadband | 2.56 mW/cm2 | 50 min | No smearing[1] | No | cracks near optical zone |
| 1600-96-2B | UVB, 40 watt broadband | 2.56 mW/cm2 | 50 min | No smearing |  |  |
| 1600-96-2C | UVB, 40 watt broadband | 2.56 mW/cm2 | 50 min | No smearing |  |  |

TABLE 14-continued

| | | | | | | | |
|---|---|---|---|---|---|---|---|
| 1600-96-3A | UVB, 40 watt broadband | 2.56 mW/cm2 | 50 min | No smearing[1] | No | | cracks near optical zone |
| 1600-96-3B | UVB, 40 watt broadband | 2.56 mW/cm2 | 50 min | No smearing | | | |
| 1600-96-3C | UVB, 40 watt broadband | 2.56 mW/cm2 | 50 min | No smearing | | | |
| 3260-1A | UVB, 40 watt broadband | 2.55 mW/cm2 | 90 min | some fading | No | | cracks near print zone |
| 3260-1B | UVB, 40 watt broadband | 2.55 mW/cm2 | 90 min | smude | | | |
| 3260-1C | UVB, 40 watt broadband | 2.55 mW/cm2 | 90 min | No smearing | | | |
| 3260-1A | Hammamatsu ~297 nm | 40% Intensity | 30 sec | Some fading | No | | cracks near print zone |
| 3260-1B | Hammamatsu ~297 nm | 40% Intensity | 30 sec | smudge | | | |
| 3260-1C | Hammamatsu ~297 nm | 40% Intensity | 30 sec | No smearing | | | |
| 3260-1A | Hammamatsu ~297 nm | 20% Intensity | 60 sec | Some fading | No | | cracks near print zone |
| 3260-1B | Hammamatsu ~297 nm | 20% Intensity | 60 sec | smudge. | | | |
| 3260-1C | Hammamatsu ~297 nm | 20% Intensity | 60 sec | No smearing | | | |
| 3260-2A | UVB, 40 watt broadband | 2.55 mW/cm2 | 90 min | smearing | no aging | | cracks in print zone |
| 3260-2B | UVB, 40 watt broadband | 2.55 mW/cm2 | 90 min | smearing | | | |
| 3260-2C | UVB, 40 watt broadband | 2.55 mW/cm2 | 90 min | smearing | | | |
| 3260-2A | Hammamatsu ~297 nm | 40% Intensity | 30 sec | No smearing | no aging | | cracks in print zone |
| 3260-2B | Hammamatsu ~297 nm | 40% Intensity | 30 sec | No smearing | | | |
| 3260-2C | Hammamatsu ~297 nm | 40% Intensity | 30 sec | No smearing | | | |
| 3260-2A | Hammamatsu ~297 nm | 40% Intensity | 60 sec | No smearing | no aging | | cracks in print zone |
| 3260-2B | Hammamatsu ~297 nm | 40% Intensity | 60 sec | No smearing | | | |
| 3260-2C | Hammamatsu ~297 nm | 40% Intensity | 60 sec | No smearing | | | |
| 3260-2A | Hammamatsu ~297 nm | 40% Intensity | 30 sec | No smearing | no aging | | cracks in print zone |
| 3260-2B | Hammamatsu ~297 nm | 40% Intensity | 30 sec | No smearing | | | |
| 3260-2C | Hammamatsu ~297 nm | 40% Intensity | 30 sec | No smearing | | | |
| 3260-2A | Hammamatsu ~297 nm | 40% Intensity | 30 sec | No smearing | age 1 day | | no cracks in print zone |
| 3260-2B | Hammamatsu ~297 nm | 40% Intensity | 30 sec | No smearing | | | |
| 3260-2C | Hammamatsu ~297 nm | 40% Intensity | 30 sec | No smearing | | | |
| 3260-2A | Hammamatsu ~297 nm | 40% Intensity | 30 sec | No smearing | age 1 day | | no cracks in print zone |
| 3260-2B | Hammamatsu ~297 nm | 40% Intensity | 30 sec | No smearing | | | |
| 3260-2C | Hammamatsu ~297 nm | 40% Intensity | 30 sec | No smearing | | | |

TABLE 15 a. Ink formulations used in the preparation of colored silicone hydrogel lenses

| Experiment # | Ink Formulation | Binder Polymer Example # | Ink Color | Photoinitiator | % Binder Polymer | % Pigment | % Photoinitiator | % Ethanol | Total % |
|---|---|---|---|---|---|---|---|---|---|
| 12a | 3260-3A | 12 | Black | Irgacure 907 | 39.97 | 9.46 | 1.00 | 49.56 | 100 |
| | 3260-3B | 12 | Green | Irgacure 907 | 39.83 | 7.69 | 1.03 | 51.45 | 100 |
| | 3260-3C | 12 | Hazel | Irgacure 907 | 39.830 | 5.880 | 1.020 | 53.270 | 100 |
| 12b | 3260-3A | 12 | Black | Irgacure 907 | 39.97 | 9.46 | 1.00 | 49.56 | 100 |
| | 3260-3B | 12 | Green | Irgacure 907 | 39.83 | 7.69 | 1.03 | 51.45 | 100 |
| | 3260-3C | 12 | Hazel | Irgacure 907 | 39.830 | 5.880 | 1.020 | 53.270 | 100 |

TABLE 15-continued

| 12c | 3260-3A | 12 | Black | Irgacure 907 | 39.97 | 9.46 | 1.00 | 49.56 | 100 |
| --- | --- | --- | --- | --- | --- | --- | --- | --- | --- |
|  | 3260-3B | 12 | Green | Irgacure 907 | 39.83 | 7.69 | 1.03 | 51.45 | 100 |
|  | 3260-3C | 12 | Hazel | Irgacure 907 | 39.830 | 5.880 | 1.020 | 53.270 | 100 |
| 12d | 3260-3A | 12 | Black | Irgacure 907 | 39.97 | 9.46 | 1.00 | 49.56 | 100 |
|  | 3260-3B | 12 | Green | Irgacure 907 | 39.83 | 7.69 | 1.03 | 51.45 | 100 |
|  | 3260-3C | 12 | Hazel | Irgacure 907 | 39.830 | 5.880 | 1.020 | 53.270 | 100 | b. Ink curing conditions used in the preparation of colored silicone hydrogel lens

| Ink Formulation | Ink Cure Source | Intensity | Cure Time | Print Image after lens extraction | Aging before lens extraction | Comment |
| --- | --- | --- | --- | --- | --- | --- |
| 3260-3A | UVB, 40 watt broadband | 2.45 mW/cm2 | 60 min | some smearing | No | cracks in print zone |
| 3260-3B | UVB, 40 watt broadband | 2.45 mW/cm2 | 60 min | some smearing |  |  |
| 3260-3C | UVB, 40 watt broad band | 2.45 mW/cm2 | 60 min | some smearing |  |  |
| 3260-3A | UVB, 40 watt broadband | 2.45 mW/cm2 | 60 min | some fading | age 1 day | No cracks in 14/16 lenses |
| 3260-3 B | UVB, 40 watt broadband | 2.45 mW/cm2 | 60 min | smudge |  |  |
| 3260-3C | UVB, 40 watt broadband | 2.45 mW/cm2 | 60 min | OK |  |  |
| 3260-3A | Hammamatsu ~297 nm | 40% Intensity | 30 sec | some fading | no ageing | cracks in print zone |
| 3260-3B | Hammamatsu ~297 nm | 40% Intensity | 30 sec | smudge |  |  |
| 3260-3C | Hammamatsu ~297 nm | 40% Intensity | 30 sec | OK |  |  |
| 3260-3A | Hammamatsu ~297 nm | 40% Intensity | 30 sec | some fading | age 1 day | no cracks in print zone |
| 3260-3B | Hammamatsu ~297 nm | 40% Intensity | 30 sec | smudge |  |  |
| 3260-3C | Hammamatsu ~297 nm | 40% Intensity | 30 sec | OK |  |  |

Footnotes for Tables 13-15
1. Some fading of outer black ring observed in some instances as noted. This is believed to be due to UV light source being slightly off center
2. Smudging can occur as second or third print is applied to the mold since pad makes contact with previously printed area.
3. Unless otherwise noted, lenses are extracted for one hour in isopropanol. Lenses are then soaked in UPW water for 30 minutes the water is replaced and the lenses are soaked for an additional 30 minutes in UPW water.
4. Aging of lenses before extraction resulted in a more durable lens and eliminated or minimized cracks near the print zone.
5. Contact Lenses made from Lotrafilcon B in polypropylene molds. Female molds are corona treated prior to pad printing. Lens formulations are cured with UVA light for 30 minutes. Lens curing light intensity ~4.6 mW/cm$^2$, Lens curing Intensity is about 4.2 mW/cm$^2$ for experiment 1.
6. The percent pigment in tables 13-15 refers to total pigment load in the ink. Ink pastes are prepared by milling pigments in ethanol on a roller mill as described in this document.. The percent pigment in ink paste is determined gravimetrically.
7. The light intensity from the Hammatsu cure source is about 17 mW/cm$^2$ at a 40% setting. For ink experiment 1 of table 13, a portable UV light source (UVP, model UVLS-28) is used in for curing at about 254 nm. The distance between the sample and the light source is about 1.5 inches.

TABLE 16

Effect of replacing a portion of TRIS with perfluorcyclohexylmethacrylate and 1H,1H,5H-octafluropentyl methacrylate.

| Binder Polymer Example Number | 43 | 27 | 31 | 40 |
| --- | --- | --- | --- | --- |
|  | 3260-53-2 | 3260-15-2 | 3260-27-2 | 3364-61 |
| Material | Wt % | Wt % | Wt % | Wt % |
| DMA | 37.86 | 37.87 | 37.97 | 37.87 |
| TRIS | 34.038 | 23.97 | 23.99 | 23.97 |
| HEMA | 9.581 | 9.57 | 9.6 | 9.57 |
| Perfluorocyclohexyl methacrylate | 0 | 10.06 | 9.94 |  |
| Cyclohexyl methacrylate | 0 |  |  |  |
| 1H,1H,5H-octafluorpentyl methacrylate | 0 |  |  | 10.07 |
| pentyl methacrylate | 0 |  |  |  |
| PDMS-MA (MCR-M17) | 14.293 | 14.31 | 14.34 | 14.31 |
| VAZO-52 | 0.549 | 0.55 | 0.37 | 0.55 |
| 2-mercaptoethanol | 0.258 | 0.25 | 0.35 | 0.25 |
| IEM | 3.42 | 3.41 | 3.45 | 3.41 |
| Total | 100 | 100 | 100 | 100 |
| Properties of Lenses |  |  |  |  |
| Dk | 52.18 | 39.04 | 40.55 | 36.31 |
| Contact Angle | 106.9 | 105.82 | 110.10 | 93.22 |

TABLE 16-continued

Effect of replacing a portion of TRIS with perfluorcyclohexylmethacrylate and 1H,1H,5H-octafluropentyl methacrylate.

| Binder Polymer Example Number | 43 | 27 | 31 | 40 |
|---|---|---|---|---|
| Tensile Properties | | | | |
| Max Elongation (%) | 121 | 112 | 110 | 120 |
| Maximum Stress (Mpa) | 0.94 | 1.38 | 1.34 | 1.07 |
| Elastic Modulus (Mpa) | 1.78 | 2.73 | 2.45 | 1.68 |
| Toughness (KJ/m$^3$) | 603 | 824 | 772 | 658 |
| Diameter (Dia) in water | 12.714 | 12.835 | 13.287 | 13.013 |
| Diameter in 100% EtOH | 17.670 | 18.022 | 18.09 | 17.919 |
| $\frac{\text{(Dia in ethanol} - \text{Dia in DI water)}}{\text{Dia in DI water}} \times 100$ | 39% | 40.2% | 36% | 27.37% |
| Lysozyme uptake after 17 days | Below limits of experiment | Below limits of experiment | Below limits of experiment | N/A |

TABLE 17

Effect of replacing a portion of TRIS with cyclohexyl methacrylate or pentyl methacrylate.

| Binder Polymer Example Number | 38 | 37 | 41 |
|---|---|---|---|
| Lot/Ref Number | 3260-53-2 | 3260-52-2 | 3364-62 |
| Material | Wt % | Wt % | Wt % |
| DMA | 37.86 | 35.248 | 37.78 |
| TRIS | 34.038 | 22.299 | 23.91 |
| HEMA | 9.581 | 8.925 | 9.54 |
| Perfluorocyclohexyl methacrylate | 0 | 0 | 0.00 |
| Cyclohexyl methacrylate | 0 | 16.271 | 0.00 |
| n-pentyl methacrylate | 0 | 0 | 10.04 |
| PDMS-MA (MCR-M17) | 14.293 | 13.324 | 14.28 |
| VAZO-52 | 0.549 | 0.509 | 0.54 |
| 2-mercaptoethanol | 0.258 | 0.236 | 0.25 |
| IEM | 3.42 | 3.19 | 3.40 |
| Total | 100 | 100 | 99.75 |
| Lens Properties | | | |
| Dk | 52.18 | 30.11 | 36.90 |
|  | (3.99) | (3.11) | (0.60) |
| Contact Angle | 106.9 | 105.5 | 105.6 |
| Tensile Properties | | | |
| Max Elongation (%) | 121 | 110 | 144 |
| Maximum Stress (Mpa) | 0.94 | 1.31 | 1.54 |
| Elastic Modulus (Mpa) | 1.78 | 2.71 | 1.62 |
| Toughness (KJ/m$^3$) | 603 | 744 | 982 |
| Diam in DI water | 12.71 | 12.800 | |
| Diam in ETOH | 17.67 | 17.785 | |
| $\frac{\text{(Dia in ethanol} - \text{Dia in DI water)}}{\text{Dia in DI water}} \times 100$ | 39% | 39% | N/A |
| Lysozyme Uptake after 17 days | Below limits of experiment | Below limits of experiment | N/A |

Lysozyme Experiments

A 0.181 mg/mL solution of lysozyme is prepared by placing 0.0181 grams of lysozyme in a 100 mL volumetric flask, dissolving the lysozyme in phosphate buffered saline and then diluting to the mark. The absorbance of the lysozyme solution is determined at 280 nm. Contact lenses are prepared from copolymers 3260-2, 3260-15-2, 3260-52-2, 3260-53-2 as described above. Lenses from each test group are placed in vials (three lenses per test group, one lens per vial) containing 5 mL of 0.1810 mg/mL of lysozyme in phosphate buffered saline. The vials are crimped, placed in a forced air oven and heated at 37° C. for about 17 days. The absorbance of the lysozyme solution in each sample vial is measured at 280 nm and the average absorbance value is computed. The differences in absorbance before and after soaking lenses in lysozyme are calculated and averaged. A decrease in lysozyme concentration is not detected under the described experimental conditions. The sensitivity of protein uptake can be increased by using a lower concentration of lysozyme and or increasing the number of lenses per unit of lysozyme

What is claimed is:

1. A method for making a colored silicone hydrogel contact lens, comprising the steps of: (a) applying a color coat to at least a portion of at least one of molding surfaces of a lens mold with an ink comprising at least one colorant, a solvent, and a fluorine-containing binder copolymer, wherein the fluorine-containing binder copolymer comprises multiple ethylenically unsaturated groups, hydrophilic segments derived from one or more hydrophilic vinylic monomers, fluorine-containing segments derived from one or more fluorine-containing vinylic monomers, and silicone-containing segments derived from at least one first silicone-containing vinylic monomer or macromer, wherein the colored coat contains a first surface exposed to the interior of the lens-forming cavity and a second surface in contact with the molding surface;

(b) curing the color coat to form a color film which comprises a colorant-entrapping polymer network and the colorant entrapped therein, wherein the amount of the ethylenically unsaturated groups in the fluorine-containing binder polymer is high enough to ensure that the fluorine-containing binder copolymer can be crosslinked actinically or thermally to form the colorant-entrapping polymer network capable of entrapping the colorant in the ink;

(c) dispensing a lens-forming material into the lens-forming cavity of the mold, wherein the lens-forming material comprises at least one second silicone-containing vinylic monomer or macromer or a silicone-containing prepolymer; and (d) curing the lens-forming material within the lens-forming cavity to form the silicone hydrogel contact lens, whereby the colored coat detaches from the molding surface and becomes integral with the body of the silicone hydrogel contact lens.

2. The method of claim 1, wherein the fluorine-containing binder copolymer is obtained by ethylenically functionalizing a fluorine-containing starting copolymer having pendant functional groups selected from the group consisting of hydroxyl groups (—OH), primary amino groups (—NH2), secondary amino groups (—NHR), carboxylic groups (—COOH), epoxy groups, aldehyde groups (—CHO), amide groups (—CONH2), acid halide groups (—COX, X=Cl, Br, or I), isothiocyanate groups, isocyanate groups, halide groups (—X, X=Cl, Br, or I), acid anhydride groups, and combinations thereof.

3. The method of claim 2, wherein the fluorine-containing starting copolymer with pendant functional groups is a copolymerization product of polymerizable composition (A) or (B), wherein the composition (A) comprises (a) at least one fluorine-containing vinylic monomer, (b) at least one hydrophilic vinylic monomer, (c) at least one functionalizing vinylic monomer containing at least one functional group, and (d) at least one silicone-containing vinylic monomer or macromer, and wherein the composition (B) comprises (a) at least one fluorine-containing vinylic monomer, (b) at least one hydrophilic vinylic monomer, (c) at least one chain transfer agent comprising a chain transfer group and a functional group to obtain a copolymerization product with functional groups.

4. The method of claim 2, wherein before applying the color coat, a clear solution which comprises polymerizable components and is free of colorant is applied to a molding surface of a mold to form a transferable clear coating onto which the color coat can be applied.

5. The method of claim 4, wherein the clear solution includes the actinically-curable fluorine-containing copolymer.

6. The method of claim 1, wherein the lens-forming material is a solution, solvent-free liquid, or melt of one or more silicone-containing prepolymers with ethylenically unsaturated groups optionally in presence of other components, wherein the mold is a reusable mold, wherein the lens-forming material is cured actinically under a spatial limitation of actinic radiation to form a contact lens.

* * * * *